(12) United States Patent
Wei et al.

(10) Patent No.: US 12,521,701 B2
(45) Date of Patent: Jan. 13, 2026

(54) BASE MATERIAL AND PREPARATION METHOD THEREOF

(71) Applicant: Nanjing University of Science and Technology, Nanjing (CN)

(72) Inventors: Kajia Wei, Nanjing (CN); Weiqing Han, Nanjing (CN); Lu Wang, Nanjing (CN); Siqi Liu, Nanjing (CN); Run Liu, Nanjing (CN); Juncheng Dai, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 982 days.

(21) Appl. No.: 17/666,628

(22) Filed: Feb. 8, 2022

(65) Prior Publication Data

US 2022/0250042 A1   Aug. 11, 2022

(30) Foreign Application Priority Data

Feb. 8, 2021  (CN) .......................... 202110172267.9
Feb. 9, 2021  (CN) .......................... 202110175940.4

(51) Int. Cl.
| | | |
|---|---|---|
| B32B 15/04 | (2006.01) | |
| B01J 21/04 | (2006.01) | |
| B01J 21/06 | (2006.01) | |
| B01J 23/14 | (2006.01) | |
| B01J 23/755 | (2006.01) | |
| B01J 35/64 | (2024.01) | |
| B01J 37/06 | (2006.01) | |
| B01J 37/34 | (2006.01) | |
| C02F 1/72 | (2023.01) | |
| C02F 101/34 | (2006.01) | |

(52) U.S. Cl.
CPC ............. *B01J 23/755* (2013.01); *B01J 21/04* (2013.01); *B01J 21/063* (2013.01); *B01J 23/14* (2013.01); *B01J 35/647* (2024.01); *B01J 35/651* (2024.01); *B01J 37/06* (2013.01); *B01J 37/348* (2013.01); *B32B 15/04* (2013.01); *C02F 1/725* (2013.01); *B01J 2235/30* (2024.01); *C02F 2101/34* (2013.01)

(58) Field of Classification Search
CPC .................................................... B32B 15/04
USPC ..................................................... 428/472.1
See application file for complete search history.

(56) References Cited

U.S. PATENT DOCUMENTS

2009/0283736 A1* 11/2009 Kanzawa ........... H10N 70/8833
257/E45.001
2012/0252184 A1* 10/2012 Ninomiya ............... C23C 26/00
257/E21.645

\* cited by examiner

*Primary Examiner* — Katherine A Christy
(74) *Attorney, Agent, or Firm* — MATTHIAS SCHOLL P.C.; Matthias Scholl

(57) ABSTRACT

A base material includes a base layer. The base layer includes a structured surface. The base layer includes a transition metal and a transition metal oxide, and a sum of the transition metal and a transition metal oxide accounts for at least 90 wt. % of the base layer. The transition metal oxide is concentratedly distributed on the structured surface. The base material is flexible in at least one direction, and has a bending angle of not less than 90° when being bent.

4 Claims, 19 Drawing Sheets

BASE MATERIAL AND PREPARATION METHOD THEREOF

CROSS-REFERENCE TO RELATED APPLICATIONS

Pursuant to 35 U.S.C. § 119 and the Paris Convention Treaty, this application claims foreign priority to Chinese Patent Application No. 202110172267.9 filed Feb. 8, 2021, and to Chinese Patent Application No. 202110175940.4 filed Feb. 9, 2021. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of material preparation and application, and more particularly, to a base material and a preparation method thereof.

Currently, based on the water pollution situation, especially the difficulty in the treatment of chemical wastewater containing organic matter, wastewater treatment has become an important prerequisite for achieving the goal of near-zero wastewater discharge and resource utilization. Heterogeneous catalytic oxidation technology (HCO) can generate highly oxidative active radicals ($\cdot OH$, $\cdot O_2-$, $\cdot O$, etc.) on the surface of solid-phase catalysts to achieve the removal of refractory organics. Active radicals are mainly generated at the sites of oxygen vacancies, Lewis acids and functional groups on the catalyst surface. However, the internal structure of existing granular catalysts cannot be directly involved in the catalysis, and a large number of internal structures not only reduces the bulk density of active sites, but also leads to material waste and increased costs. By reducing the size of the catalyst to the micro/nano level (i.e. powder form), an ultra-high specific surface area can be obtained, and the probability of contact with the catalyst/organic matter can be increased to break through the bottleneck of mass transfer in low-concentration wastewater treatment. However, additional membrane separation and recovery processes are required for the powdery catalyst, which are expensive and complicated to operate, and are difficult to apply.

The "two-dimensionalization" of three-dimensional catalysts provides a feasible approach for solving the above problems. For example, based on two-dimensional porous electrodes prepared by anodization, Sn, Sb, etc. are loaded in the pores to realize advanced oxidation applications. However, apart from electrodes, heterogeneous catalytic oxidation processes based on 2D catalysts are rare. One of the reasons is that a hard template is obtained by the anodic oxidation method, and the catalyst prepared with the hard template as a matrix lacks flexibility, the catalytic layer is dense and fragile, and the nanopores are all dead pores, and the organic matters can only diffuse radially inwardly along the channel ports, so the mass transfer efficiency is still limited.

SUMMARY

A first object of the disclosure is to provide a base material with certain flexibility, which can solve the problems of compactness and fragility of conventional base material during use.

A second object of the disclosure is to provide a method for preparing the base material with certain flexibility.

A base material comprises a base layer, and the base layer comprises a structured surface; the base layer comprises a transition metal and a transition metal oxide, and the sum of the transition metal and a transition metal oxide accounts for at least 90 wt. % of the base layer; the transition metal oxide is concentratedly distributed on the structured surface; the base material is flexible in at least one direction, and has a bending angle of not less than 90° when being bent.

In some embodiments, the base layer comprises a transition metal and a transition metal oxide, and the sum of the contents thereof is at least 90% of the weight of the base layer; the amount of at least 90% of the transition metal oxide is concentratedly distributed on a structured surface; in some embodiments, the base layer comprises a transition metal and a transition metal oxide, and the sum of their contents thereof is at least 95% of the weight of the base layer; the amount of at least 95% of the transition metal oxide is concentratedly distributed on a structured surface; in some embodiments, the base layer comprises a transition metal and a transition metal oxide, and the sum of the contents thereof is at least 98% of the weight of the base layer; the amount of at least 98% of the transition metal oxide is concentratedly distributed on a structured surface; in some embodiments, the base layer comprises a transition metal and a transition metal oxide, and the sum of the contents thereof is close to 100% (under the premise of ignoring certain trace impurities in any material); the amount of approximately 100% of the transition metal oxide is concentratedly distributed on a structured surface.

In a class of this embodiment, the bending angle of the base material is not less than 120° when bending.

In a class of this embodiment, the bending angle of the base material is approximately 180° when bending.

It should be noted herein that, it is very important to have flexibility for the base material as shown in FIG. 7 during use, for example, the base material is used as a carrier for the preparation of water treatment catalysts/adsorbents. The integrity of the material can be well reserved during use, ensuring that the catalyst has good mechanical properties and structural stability and avoiding the powdering of the catalyst, and making the separation and recovery to be more convenient. A material with certain flexibility has better toughness and lower brittleness, and lower probability of breaking during use. For example, the most typical traditional porous anodized transition metal template has holes distributed in regular arrays on the surface, and the material has extremely high brittleness. If the carrier is used for preparing a catalyst, it will be fragile during use and the loss will be extremely large.

In a class of this embodiment, the base material has a bulk density not higher than 1 $g/cm^3$; preferably, the base material has a bulk density of 0.1-0.5 $g/cm^3$. In addition, the base material has an apparent density of not less than 1 $g/cm^3$ and a porosity of not less than 5%; preferably, the porosity is 5-30%.

It should be noted herein that, it is important for the base material to have a light-weight property during use. For example, the base material is used as a carrier for the preparation of water treatment catalysts/adsorbents. The prepared catalyst is used in an environment with a certain water flow rate/aeration environment, and the catalyst can generate dynamic relative motion with the water body/air flow. On the one hand, it can avoid the problem of low utilization rate caused by catalyst accumulation, and on the other hand, there is a certain void ratio between the catalysts to further improve the mass transfer rate. Since the catalyst has the flexibility, the catalyst breakage can be avoided/reduced during the process.

In a class of this embodiment, the base material comprises transition metal flakes as raw materials; a plurality of concave and convex stripes is disposed on the transition metal flakes in a substantially uniform direction, and the cross-sections of the concave and convex stripes have the characteristics of mesoscopic scale.

It should be noted herein that, as shown in FIG. 19, the mesoscopic level size of the cross section mainly means that the width (or the maximum width) L1 of the convex stripes, the width L2 (or the maximum width or the maximum spacing between two adjacent stripes) of concave stripes, the height H of the convex stripes (or the maximum height or the maximum depth of the concave stripes) are in a mesoscopic level.

In one aspect of this embodiment, the base material satisfies one or more of the following conditions: the thickness of the transition metal flakes is not greater than 500 μm; preferably the thickness is 30-300 μm; more preferably the thickness is 50-200 μm.

In a class of this embodiment, the structured surface is formed by performing an etching treatment on the transition metal flakes having hole arrays.

In one aspect of this embodiment, the base material satisfies one or more of the following conditions:
  i) A transition metal oxide film is formed on the surface of the transition metal flake, and has a hole array consistent with the direction of the concave and convex stripes, and the holes have an aperture of mesoscopic scale, and then the corrosion treatment is performed to form the structured surface;
  ii) The pore layer is an oxide layer formed after anodization treatment.

A base material having the following microstructure: comprises a base layer having a structured surface, and the structured surface comprises:
  a) a first protrusion portion, where the first protrusion portion extends along one direction of the structured surface;
  b) a first structural channel extending substantially in the same direction as the first protrusion portion and being adjacent to the first protrusion portion; and
  c) a plurality of holes distributed in the first protrusion portion and/or the first structural channel; preferably, there are a plurality of holes distributed in the first protrusion portion; at least 0.05% of the holes distributed in the first protrusion portion communicate with the adjacent first structural channel to form a second structural channel;

It should be noted herein that, the one direction may be the length direction, width direction, oblique direction or other direction with a certain length of the base layer, as long as the plurality of the first protrusion portions on the surface of the base layer have basically the same direction.

The base material comprises at least one transition metal and a corresponding oxide of the transition metal; the base layer comprises a transition metal and a transition metal oxide, and the sum of the transition metal and the transition metal oxide is at least 90% of the weight of the base layer; the transition metal oxide is concentratedly distributed on the structured surface.

In some embodiments, the base layer comprises a transition metal and a transition metal oxide, and the sum of the contents thereof is at least 90% of the weight of the base layer; the amount of at least 90% of the transition metal oxide is concentratedly distributed on a structured surface; in some embodiments, the base layer comprises a transition metal and a transition metal oxide, and the sum of the contents thereof is at least 95% of the weight of the base layer; the amount of at least 95% of the transition metal oxide is concentratedly distributed on a structured surface; in some embodiments, the base layer comprises a transition metal and a transition metal oxide, and the sum of the contents thereof is at least 98% of the weight of the base layer; the amount of at least 98% of the transition metal oxide is concentratedly distributed on a structured surface; in some embodiments, the base layer comprises a transition metal and a transition metal oxide, and the sum of the contents thereof is close to 100% (under the premise of ignoring certain trace impurities in any material); the amount of approximately 100% of the transition metal oxide is concentratedly distributed on a structured surface.

In some embodiments, at least 5%, or 10%, or 20%, or 30%, or 50%, or 70%, or 90%, or nearly 100% of holes that are distributed on the first protrusion portion communicate with the adjacent first structural channels; in some embodiments, 0.05-80%, or 1-70%, or 5-60%, or 10-60%, or 30-50%, or 50-90%, or 60-80% of the holes that are distributed on the first protrusion portion communicate with the adjacent first structural channels to form a second structural channel.

It should be noted herein that, the microscopic structure specifically refers to the structure that can be observed under a magnifying state by using magnifying equipment, for example, a scanning electron microscope. The magnification factor can be adjusted according to the actual situation. The microstructure described herein can be observed by magnifying the material to 100-1,000,000 times by a scanning electron microscope;

In addition, the first structural channel and the structure thereof are the main reasons for the flexibility of the base material, and the structure with a higher porosity and smaller cross-section is generally easier to bend; a second structural channel formed through communication between the first structural channel (also referred to as the channel or the pore structure hereinafter) and a plurality of holes on the first protrusion portion is the key to improve the mass transfer rate of the base material. Without being limited by theory, a channel and/or a pore structure with high connectivity generally has a greater mass transfer rate, for example, the only difference between the two is whether the holes located on the first protrusion portion have the characteristics of communication with the first structural channel, and those with the characteristics of communication have a higher mass transfer rate and a higher internal utilization rate of material than those without characteristics of communication. Further, without being limited by theory, those with a channel structure generally has a larger mass transfer rate. For example, the difference between the two is only that, the former has both channels and holes communicating with the channels, and the latter has only holes independent of each other, but has no channels; during the application process, the former has higher mass transfer rate and internal utilization rate of the material, and has flexibility, and for the latter, water and pollutants can only diffuse through each hole port, with low efficiency, and a large number of internal structures do not have contribution to the reaction.

In one aspect of this embodiment, the base material satisfies one or more of the following conditions:
  i) two adjacent channels of the structured surface can communicate through holes;

ii) a plurality of holes is distributed on the channel wall (including the side wall and bottom of the channel) of the first structural channel; and iii) at least 0.05% of the holes are irregular holes.

It should be noted herein that, for i) and ii), the higher the degree of communication, the higher the porosity, and the higher the mass transfer rate of the base material and the internal utilization rate of the material. For iii), it should be noted that the "irregularity" of the holes may be directly caused by the material preparation method, or may be formed by the communication of several relatively regular holes.

In a class of this embodiment, the base material is flexible in at least one direction; according to a bending test, the base material has a bending angle of not less than 90°.

In some embodiments, the bending angle is not less than 120°; in some embodiments, the bending angle is not less than 150°; in some embodiments, the bending angle can reach 180°. It should be noted herein that, as shown in FIG. 17B, the base material has a first protrusion portion and a first structural channel extending in the direction shown by arrow A, and at this time, the base material has flexibility at least in the direction shown by arrow B. According to a bending test, the base material has a bending angle of not less than 90° or 120° or 150° or 180°.

In a class of this embodiment, the base material has a bulk density not higher than 1 g/cm$^3$; preferably, the base material has a bulk density of 0.1-0.5 g/cm$^3$.

In a class of this embodiment, the base material is prepared by using transition metal flakes as raw materials. A plurality of concave and convex stripes with a substantially uniform direction is disposed on the transition metal flakes, and the cross-sections of the concave and convex stripes have the characteristics of mesoscopic scale.

In one aspect of this embodiment, the base material satisfies one or more of the following conditions:

The base material is prepared by using transition metal flakes as raw materials, and the thickness of the transition metal flakes is not greater than 500 μm; preferably, the thickness is 30-300 μm; more preferably, the thickness is 50-200 μm.

In a class of this embodiment, a transition metal oxide film is formed on the surface of the transition metal flake, and has a hole array consistent with the direction of the concave and convex stripes, and the holes have an aperture of mesoscopic scale;

The structured surface is formed by performing an etching treatment on the transition metal flakes.

In one aspect of this embodiment, the base material satisfies one or more of the following conditions:

i) a transition metal oxide film and a hole array with an aperture of mesoscopic scale are formed simultaneously on the surface of the base layer, then an etching treatment is performed on the surface of the base layer to form the structured surface;

ii) the transition metal oxide film and pores with an aperture of mesoscopic scale are formed by anodizing the transition metal flakes.

In a class of this embodiment, the transition metal includes but is not limited to one or more of aluminum, tin, nickel and titanium; the transition metal oxide includes but is not limited to one or more of the oxides of aluminum, tin, nickel and titanium.

A base material comprises: a first structural layer, a second structural layer located at least on one surface of the first structural layer; the second structural layer comprising:

a) a first protrusion portion, where the first protrusion portion extends along one length direction of the second structural layer;

b) a first concave portion that extends substantially in the same direction as the first protrusion portion and is adjacent to the first protrusion portion; and c) a plurality of holes distributed in the first protrusion portion;

at least 0.05% of the holes communicate with the adjacent first concave portions;

the base material comprises at least one transition metal and the corresponding oxide of the transition metal; the content of the transition metal in the first structural layer is at least 90%, and the content of the oxide of the transition metal in the second structural layer is at least 30%, preferably not less than 90%.

In some embodiments, the base layer comprises transition metals and transition metal oxides, the transition metals are mainly concentrated in the first structural layer, and the transition metal oxides are mainly concentrated in the second structural layer; in some embodiments, the content of the transition metal in the first structural layer is at least 90%, and the content of the transition metal oxide in the second structural layer is at least 30%; in some embodiments, the content of the transition metal in the first structural layer is at least 90%, the content of the transition metal oxide in the second structural layer is at least 60%; in some embodiments, the content of the transition metal in the first structural layer is at least 90%, the content of the transition metal oxide in the second structural layer is at least 90%; in some embodiments, the content of the transition metal in the first structural layer is at least 95%, the content of the transition metal oxide in the second structural layer is at least 30%; in some embodiments, the content of the transition metal in the first structural layer is at least 95%, the content of the transition metal oxide in the second structural layer is at least 65%; in some embodiments, the content of the transition metal in the first structural layer is at least 95%, the content of the transition metal oxide in the second structural layer is at least 98%; in some embodiments, the content of the transition metal in the first structural layer is at least 98%, the content of the transition metal oxide in the second structural layer is at least 98%; in some embodiments, the content of the transition metal in the first structural layer is at least 99%, the content of the transition metal oxide in the second structural layer is at least 99%; in some embodiments, the content of the transition metal in the first structural layer is 100%, the content of the transition metal oxide in the second structural layer is 100%; (under the premise of ignoring certain trace impurities in any material).

In some embodiments, at least 5%, or 10%, or 20%, or 30%, or 50%, or 70%, or 90%, or nearly 100% of holes that are distributed on the first protrusion portion communicate with the adjacent first concave portions; in some embodiments, 0.05-80%, or 1-70%, or 5-60%, or 10-60%, or 30-50%, or 50-90%, or 60-80% of the holes that are distributed on the first protrusion portion communicate with the adjacent first concave portions to form a structural channel.

It should be noted herein that, the microscopic structure specifically refers to the structure that can be observed under a magnifying state by using magnifying equipment, for example, a scanning electron microscope. The magnification factor can be adjusted according to the actual situation. The microstructure described herein can be observed by magnifying the material to 100-1,000,000 times by a scanning electron microscope;

In addition, overall, the first concave portion in the disclosure described herein is the first structural channel of the base material (hereinafter also referred to as a channel or a pore structure), which is the main reason for the flexibility of the base material. The presence of a first concave portion and its structure enables the base material to have a higher porosity and a smaller cross-section, which is thus easier to bend.

The communication between the first concave portion and the plurality of holes on the first protrusion portion enables the base material to have a structured surface. As shown in the figure, through an enlarged view of a fault section of a base material similar to that shown in FIG. 3, as a whole, the base material can be artificially divided to form a first structural layer 5 and a second structural layer 4 located on the surface thereof (i.e. the structured surface of the base material as described in this paragraph). The first concave portion substantially contributes to the abundance of channels or pores in the second structural layer (i.e., the structured surface of the base material) existing on the surface of the base material, and is the key to improving the mass transfer rate of the base material. Without being limited by theory, a channel and/or pore structure with high connectivity generally has a greater mass transfer rate, for example, the only difference between the two is whether the holes located on the first protrusion portion have the characteristics of communication with the first structural channel, and those with the characteristics of communication have a higher mass transfer rate and a higher internal utilization rate of material than those without characteristics of communication. Further without being limited by theory, those with a first structural channel generally has a larger mass transfer rate. For example, the difference between the two is only that, the former has both first structural channel and holes communicating with the first structural channel, and the latter has only holes independent of each other, but has no first structural channel; during the application process, the former has higher mass transfer rate and internal utilization rate of the material, and has flexibility, and for the latter, water and pollutants can only diffuse through each hole port, with low efficiency, and a large number of internal structures do not have contribution to the reaction.

In one aspect of this embodiment, the base material satisfies one or more of the following conditions:
i) two adjacent channels of the second structural layer or the first structural channel (also referred to as the first concave portion) can communicate through holes;
ii) a plurality of holes is distributed on the channel wall (including the side wall and bottom of the channel) of the first structural channel;
iii) at least 0.05% of the holes are irregular holes.

It should be noted herein that, for i) and ii), the higher the degree of communication, the higher the porosity, and the higher the mass transfer rate of the base material and the internal utilization rate of the material. For iii), it should be noted that the "irregularity" of the holes may be formed by the material preparation method, or may be formed by the interconnection of several relatively regular holes.

In a class of this embodiment, the base material is flexible in at least one direction; according to a bending test, the base material has a bending angle of not less than 90°.

In some embodiments, the bending angle is not less than 120°; in some embodiments, the bending angle is not less than 150°; in some embodiments, the bending angle can reach 180°. It should be noted herein that, as shown in FIG. 17B, the base material has a first protrusion portion and a first concave portion (forming a first structural channel) extending in the direction shown by arrow A, and at this time, the base material has flexibility at least in the direction shown by arrow B. According to a bending test, the base material has a bending angle of not less than 90° or 120° or 150° or 180°.

In a class of this embodiment, the base material has a bulk density not higher than 1 g/cm$^3$; preferably, the base material has a bulk density of 0.1-0.5 g/cm$^3$.

In a class of this embodiment, the base material is prepared by using transition metal flakes as raw materials; a plurality of concave and convex stripes with a substantially uniform direction is disposed on the transition metal flakes, and the cross-sections of the concave and convex stripes have the characteristics of mesoscopic scale (or micron and/or nanometer).

In one aspect of this embodiment, the base material satisfies one or more of the following conditions:
The base material is prepared by using transition metal flakes as raw materials, and the thickness of the transition metal flakes is not greater than 500 μm; preferably, the thickness is 30-300 μm; more preferably, the thickness is 50-200 μm.

In a class of this embodiment, a transition metal oxide film is formed on the surface of the transition metal flake, and has a hole array consistent with the direction of the concave and convex stripes; and the holes have an aperture of mesoscopic scale or an aperture of nanometer and/or micron scale.

The second structural layer is formed by performing an etching treatment on the transition metal flakes.

In one aspect of this embodiment, the base material satisfies one or more of the following conditions:
i) a transition metal oxide film and a hole array with an aperture of mesoscopic (or micron and/or nanometer) size are formed simultaneously on the surface of the base layer, then an etching treatment is performed on the surface of the base layer to form the structured surface;
ii) the transition metal oxide film and pores with an aperture of mesoscopic (or micron and/or nanometer) size are formed by performing an etching treatment on the transition metal flakes having transition metal oxide films and holes.

A method for preparing a base material, comprises:
1) performing treatment on transition metal flakes to form a hole array with an aperture of mesoscopic scale distributed along the stripe direction; or a hole array with a nanoscale and/or micron-scale aperture distributed along the stripe direction;
there are concave and convex stripes on the surface of the transition metal flakes, and the concave and convex stripes have a cross-section of mesoscopic scale; it should be noted herein that, as shown in FIG. 19, the size of the cross-section at the mesoscopic level mainly means that the sizes of the width (or maximum width) L1 of the convex stripes, the width L2 of the concave stripes (or the maximum width or the maximum spacing between two adjacent convex stripes), the height H of the convex stripes (or the maximum height or the maximum depth of the concave stripes) are at the mesoscopic level.
2) etching the material obtained in 1), to form a base material that is flexible in at least one direction.

In a class of this embodiment, the concave and convex stripes on the surface of the transition metal flakes comprise: a plurality of convex stripes with the same direction or substantially the same direction, and concave stripes formed between two adjacent convex stripes; and/or, a plurality of convex stripes parallel or substantially parallel to each other, and concave stripes formed between two adjacent convex stripes.

In a class of this embodiment, the width of the convex stripes on the surface of the transition metal flakes is at least 10 nm; and/or, a concave stripe with a depth of at least 3 nm is formed between the two adjacent convex stripes; and/or, the spacing between the two adjacent convex stripes is at least 10 nm.

It should be noted herein that, the cross-sectional shape of the convex stripes is not limited to a specific shape, for example, it can be any shape of 1 to 4 shown in FIG. 19; the (maximum) width L1 of the convex stripes on the surface of the transition metal flakes is at least 10 nm; and/or, a concave stripe with a (maximum) depth H of at least 3 nm is formed between the two adjacent convex stripes; and/or, the (maximum) spacing L2 between the two adjacent convex stripes (or the maximum width of the concave stripes) is at least 10 nm.

In a class of this embodiment, the width of the convex stripes on the surface of the transition metal flakes is 0.01-50 µm; and/or, a concave stripe with a maximum depth of 0.001-10 nm is formed between the two adjacent convex stripes; and/or, the spacing between two adjacent convex stripes is 0.01-50 µm.

In a class of this embodiment, the depth of the holes is at least 20 nm; and/or the average aperture of the holes is at least 10 nm; and/or, the wall thickness of the holes is at least 5 nm.

In a class of this embodiment, the depth of the holes is 0.02-80 µm; and/or the average aperture of the holes is at least 10-500 nm; and/or, the wall thickness of the holes is 5-100 nm.

It should be noted herein that, particularly, there needs to be a certain restrictive relationship between the aperture size of the hole and the spacing between two adjacent convex stripes, and the aperture of the hole cannot exceed the spacing between two adjacent convex stripes, otherwise an effective microstructure cannot be formed.

In a class of this embodiment, the material obtained in 1) is etched by using an acid solution.

In a class of this embodiment, the pH value of the acid solution is 1-3.00, and the time for acid etching is 5-70 min.

And/or, the hydrogen ion concentration in the acid solution is 0.001 mol/L-0.65 mol/L; the time for acid etching is 5-70 min.

It should be noted herein that, as shown in FIG. 2A, a hard template structure with multiple holes will be formed on the surface of the transition metal flakes after anodization, as shown in FIG. 2B, and the acid etching process will produce corrosion and thinning and even damage on the hole wall between adjacent holes (as shown in FIG. 4A), especially produce obvious corrosion on the hole wall between two adjacent holes distributed along the direction of the concave and convex stripes on the surface of the transition metal flakes.

A structured surface can be effectively formed by limiting the time of acid etching control and limiting the pH of the acid solution or the hydrogen ion concentration in the acid solution; if the time of acid etching control is too long or the pH of the acid solution is too low or the hydrogen ion concentration in the acid solution is too high, excessive acid etching may be caused, resulting in the risk of complete peeling of the structured surface of the base material, and finally the surface of the base material can no longer retain the channel, the first protrusion portion and the corresponding pore structure, forming a surface structure with only independent holes as shown in FIG. 6B; if the time of acid etching control is insufficient or the pH of the acid solution is too high or the hydrogen ion concentration in the acid solution is too low, insufficient acid etching will be caused, such that effective communication between the holes and channels on the structured surface of the base material cannot be formed, to form a second structural channel, and finally there are no effective channels, first protrusion portions and corresponding pore structures on the surface of the base material, and a surface structure as shown in FIG. 6A is formed.

In some embodiments, the hydrogen ion concentration in the acid solution may be 0.001 mol/L-0.65 mol/L, for example, the hydrogen ion concentration in the acid solution may be 0.001 mol/L-0.01 mol/L, 0.001 mol/L-0.015 mol/L, 0.001 mol/L-0.015 mol/L, 0.001 mol/L-0.02 mol/L, 0.001 mol/L 0.03 mol/L, 0.001 mol/L 0.05 mol/L, 0.001 mol/L-0.06 mol/L, 0.001 mol/L-0.7 mol/L, 0.001 mol/L-0.8 mol/L, 0.001 mol/L-0.9 mol/L, 0.001 mol/L-0.10 mol/L, 0.05 mol/L-0.07 mol/L, 0.05 mol/L-0.10 mol/L, 0.06 mol/L-0.07 mol/L, 0.06 mol/L-0.08 mol/L, 0.06 mol/L-0.10 mol/L, 0.07 mol/L-0.08 mol/L, 0.07 mol/L-0.9 mol/L, 0.07 mol/L-0.10 mol/L, 0.07 mol/L-0.12 mol/L, 0.09 mol/L-0.10 mol/L, 0.09 mol/L-0.12 mol/L, 0.12 mol/L-0.65 mol/L.

In some embodiments, the pH of the acid solution may be 0.92-3.00, for example, 0.92-1, 1-2, 2-2.2, 2-2.5, 2-3.

In some embodiments, the acid solution is an acid solution containing phosphoric acid, when the phosphoric acid concentration is 2 wt. %, the pH is 2.8, and the hydrogen ion concentration is $1.6 \times 10^{-3}$ mol/L; when the phosphoric acid concentration is 15 wt. %, the pH is 1.90, and the hydrogen ion concentration is $1.36 \times 10^{-2}$ mol/L; when the phosphoric acid concentration is 4 wt. %, the hydrogen ion concentration is $3.2 \times 10^{-3}$ mol/L, and the pH is 2.50; when the phosphoric acid concentration is 6 wt. %, the hydrogen ion concentration is $4.80 \times 10^{-3}$ mol/L, and the pH is 2.32; when the phosphoric acid concentration is 8 wt. %, the hydrogen ion concentration is $6.41 \times 10^{-3}$ mol/L, and the pH is 2.19; when the phosphoric acid concentration is 10 wt. %, the hydrogen ion molar concentration is $8.1 \times 10^{-3}$ mol/L, and the pH is 2.09.

In some embodiments, the time of the acid etching control can be 5-70 min, for example, 5-10 min, 5-25 min, 25-30 min, 25-35 min, 25-40 min, 40-45 min, 40-50 min, 40-55 min, 55-60 min, 55-65 min, 55-70 min.

The hydrogen ion concentration in the acid solution may be 0.001-0.65 mol/L, and in some embodiments, the hydrogen ion concentration in the acid solution is not higher than 0.006 mol/L, and the time of acid etching control should be not less than 30 minutes; in some embodiments, the hydrogen ion concentration in the acid solution is not higher than 0.01 mol/L, and the time of acid etching control should be not less than 20 minutes; in some embodiments, the hydrogen ion concentration in the acid solution is not higher than 0.02 mol/L, the time for the acid etching control should be not less than 15 minutes; in some embodiments, the hydrogen ion concentration in the acid solution is not higher than 0.10 mol/L, and the time for the acid etching control should be not less than 10 minutes; in some embodiments, the hydrogen ion concentration in the acid solution is not higher than 0.12 mol/L, and the time of acid etching control should be not less than 5 minutes; in some embodiments, the hydrogen ion concentration in the acid solution is 0.001-0.01 mol/L L, the time of acid etching control is 70-20 minutes; in some embodiments, the hydrogen ion concentration in the acid solution is 0.01-0.02 mol/L, and the time of acid etching control is 15-20 minutes; In some embodiments, the hydrogen ion concentration in the acid solution is 0.1-0.65 mol/L, and the time of the acid etching control is 5-10 minutes;

The pH of the acid solution may be 0.92-3. In some embodiments, the pH of the acid solution is not less than 2.5, and the time for the acid etching control should be not less than 60 minutes; in some embodiments, the pH of the acid solution is not less than 2.2, the time for the acid etching regulation should be not less than 30 minutes; in some embodiments, the pH of the acid solution is not less than 2, and the time for the acid etching control should be not less than 20 minutes; in some embodiments, the pH of the acid solution is not less than 1, and the time for the acid etching control should be not less than 10 minutes; in some embodiments, the pH of the acid solution is 2-2.5, and the time for the acid etching control is 20-30 minutes; in some embodiments, the pH of the acid solution is 0.94-2.5, and the time for the acid etching control is 10-30 minutes; in some embodiments, the pH of the acid solution is 2.5-3, and the time for the acid etching control is 30-70 minutes.

A method for preparing a base material, comprises:
1) anodizing: anodizing transition metal flakes with convex stripes on the surface, to form a hole array with an aperture of mesoscopic scale distributed along the stripe direction on the surface of the transition metal flakes; or, a hole array with a nanoscale and/or micronscale aperture distributed along the stripe direction; and
2) etching control: performing surface etching treatment on the transition metal flakes, to form a base material that is flexible in at least one direction.

It should be noted herein that, the surface of the transition metal flakes subjected to anodizing treatment needs to have the characteristics of "concave and convex stripes", which is the basic condition for forming a flexible base material after the etching control. The inventors of the disclosure have tried to perform anodizing treatment on transition metal flakes with smooth surfaces or disordered textures, and then perform etching control, and found that regardless of the restriction on the experimental parameters, a flexible base material cannot be obtained. Therefore, the "concave and convex stripes" on the surface of the transition metal flakes not only have a guiding role in the formation of hole arrays during anodization, but also have a guiding role in the etching effect.

In a class of this embodiment, when anodizing, the electrode spacing is 0.3-10 cm, the voltage is 10-200 V, and the oxidation time is 2-48 h.

In a class of this embodiment, during the anodization, the electrode spacing is 0.5-3 cm, the voltage is 40-80 V, and the oxidation time is 6-24 hours. After the anodization is completed, the transition metal flakes are washed clean and placed in clean water for preservation.

In a class of this embodiment, the anodizing electrolyte comprises at least one of oxalic acid, sulfuric acid, phosphoric acid or hydrofluoric acid.

In one aspect of this embodiment, the anodizing electrolyte meets one or more of the following conditions:
i) the acid concentration in the anodizing electrolyte is 10-80 g/L;
ii) in the process of anodization, the reaction vessel containing the anodizing electrolyte needs to be placed in an ice-water bath to maintain the temperature of the anodizing electrolyte between 0° C. and 15° C. in the vessel.

In a class of this embodiment, when the acid in the anodizing electrolyte is oxalic acid, the concentration of oxalic acid is 10-80 g/L, the oxidation time during anodizing is 6-12 hours, and the voltage is 30-80 V. When the acid in the anodizing electrolyte is sulfuric acid, the concentration of sulfuric acid is 10-100 g/L, the oxidation time during anodizing is 2-16 hours, and the voltage is 10-30 V. When the acid in the anodizing electrolyte is phosphoric acid, the phosphoric acid concentration is 30-150 g/L, the oxidation time during anodizing is 1-10 hours, and the voltage is 100-120 V When the acid in the anodizing electrolyte is hydrofluoric acid, the concentration of hydrofluoric acid is 10-20 g/L, the oxidation time during anodizing is 2-6 hours, and the voltage is 20-30 V.

In a class of this embodiment, the etching control comprises performing acid etching control on the surface of the material obtained in 1) by using an acid solution; the pH value of the acid solution is 0.92-3.00; and/or, the hydrogen ion concentration in the acid solution is 0.001 mol/L-0.65 mol/L; and the time for acid etching is 5-70 min when the acid etching control is performed.

It should be noted herein that, as shown in FIG. 2A, a hard template structure with multiple holes will be formed on the surface of the transition metal flakes after anodization, as shown in FIG. 2B, and the acid etching process will produce corrosion and even damage on the hole wall between adjacent holes (as shown in FIG. 4A), especially produce obvious corrosion on the hole wall between two adjacent holes distributed along the direction of the concave and convex stripes on the surface of the transition metal flakes.

A structured surface can be effectively formed by limiting the time of acid etching control and limiting the pH of the acid solution or the hydrogen ion concentration in the acid solution; if the time of acid etching control is too long or the pH of the acid solution is too low or the hydrogen ion concentration in the acid solution is too high, excessive acid etching may be caused, resulting in the risk of complete peeling of the structured surface of the base material, and finally the surface of the base material can no longer retain the channel, the first protrusion portion and the corresponding pore structure, forming a surface structure with only independent holes as shown in FIG. 6B; if the time of acid etching control is insufficient or the pH of the acid solution is too high or the hydrogen ion concentration in the acid solution is too low, insufficient acid etching will be caused, such that effective communication between the holes and channels on the structured surface of the base material cannot be formed, to form a second structural channel (also referred to as a first concave portion), and finally there are no effective channels, first protrusion portions and corresponding pore structures on the surface of the base material, and a surface structure as shown in FIG. 6A is formed.

In some embodiments, the hydrogen ion concentrations in the acid solution may be 0.001 mol/L-0.65 mol/L, for example, the hydrogen ion concentrations in the acid solution may be 0.001 mol/L-0.01 mol/L, 0.001 mol/L-0.015 mol/L, 0.001 mol/L-0.015 mol/L, 0.001 mol/L-0.02 mol/L, 0.001 mol/L-0.03 mol/L, 0.001 mol/L-0.05 mol/L, 0.001 mol/L-0.06 mol/L, 0.001 mol/L-0.7 mol/L, 0.001 mol/L-0.8 mol/L, 0.001 mol/L-0.9 mol/L, 0.001 mol/L-0.10 mol/L, 0.05 mol/L-0.07 mol/L, 0.05 mol/L-0.09 mol/L, 0.05 mol/L-0.10 mol/L, 0.06 mol/L-0.07 mol/L, 0.06 mol/L-0.08 mol/L, 0.06 mol/L-0.10 mol/L, 0.07 mol/L-0.08 mol/L, 0.07 mol/L-0.9 mol/L, 0.07 mol/L-0.10 mol/L, 0.07 mol/L-0.12 mol/L, 0.09 mol/L-0.10 mol/L, 0.09 mol/L-0.12 mol/L, 0.12 mol/L-0.65 mol/L.

In some embodiments, the pH of the acid solution may be 0.92-3.00, for example, 0.92-1, 1-2, 2-2.2, 2-2.5, 2-3.

In some embodiments, the acid solution is an acid solution containing phosphoric acid, when the phosphoric acid concentration is 2 wt. %, the pH is 2.8, and the hydrogen ion concentration is $1.6 \times 10^{-3}$ mol/L; when the phosphoric acid concentration is 15 wt. %, the pH is 1.90, and the hydrogen ion concentration is $1.36 \times 10^{-2}$ mol/L; when the phosphoric acid concentration is 4 wt. %, the hydrogen ion concentration is $3.2 \times 10^{-3}$ mol/L, and the pH is 2.50; when the phosphoric acid concentration is 6 wt. %, the hydrogen ion concentration is $4.80 \times 10^{-3}$ mol/L, and the pH is 2.32; when the phosphoric acid concentration is 8 wt. %, the hydrogen ion concentration is $6.41 \times 10^{-3}$ mol/L, and the pH is 2.19; when the phosphoric acid concentration is 10 wt. %, the hydrogen ion molar concentration is $8.1 \times 10^{-3}$ mol/L, and the pH is 2.09.

In some embodiments, the time of the acid etching control can be 5-70 min, for example, 5-10 min, 5-20 min, 5-25 min, 25-30 min, 25-35 min, 25-40 min, 40-45 min, 40-50 min, 40-55 min, 55-60 min, 55-65 min, 55-70 min.

The hydrogen ion concentration in the acid solution may be 0.001-0.65 mol/L, and in some embodiments, the hydrogen ion concentration in the acid solution is not higher than 0.006 mol/L, and the time of acid etching control should be not less than 30 minutes; in some embodiments, the hydrogen ion concentration in the acid solution is not higher than 0.01 mol/L, and the time of acid etching control should be not less than 20 minutes; in some embodiments, the hydrogen ion concentration in the acid solution is not higher than 0.02 mol/L, the time for the acid etching control should be not less than 15 minutes; in some embodiments, the hydrogen ion concentration in the acid solution is not higher than 0.10 mol/L, and the time for the acid etching control should be not less than 10 minutes; in some embodiments, the hydrogen ion concentration in the acid solution is not higher than 0.12 mol/L, and the time of acid etching control should be not less than 5 minutes; in some embodiments, the hydrogen ion concentration in the acid solution is 0.001-0.01 mol/L L, the time of acid etching control is 70-20 minutes; in some embodiments, the hydrogen ion concentration in the acid solution is 0.01-0.02 mol/L, and the time of acid etching control is 15-20 minutes; In some embodiments, the hydrogen ion concentration in the acid solution is 0.1-0.65 mol/L, and the time of the acid etching control is 5-10 minutes;

The pH of the acid solution may be 0.92-3. In some embodiments, the pH of the acid solution is not less than 2.5, and the time for the acid etching control should be not less than 60 minutes; in some embodiments, the pH of the acid solution is not less than 2.2, the time for the acid etching regulation should be not less than 30 minutes; in some embodiments, the pH of the acid solution is not less than 2, and the time for the acid etching control should be not less than 20 minutes; in some embodiments, the pH of the acid solution is not less than 1, and the time for the acid etching control should be not less than 10 minutes; in some embodiments, the pH of the acid solution is 2-2.5, and the time for the acid etching control is 20-30 minutes; in some embodiments, the pH of the acid solution is 0.94-2.5, and the time for the acid etching control is 10-30 minutes; in some embodiments, the pH of the acid solution is 2.5-3, and the time for the acid etching control is 30-70 minutes.

In a class of this embodiment, the acid solution for the acid etching control is a phosphoric acid solution, and the concentration is 2-15 wt. %, and the soaking time is 5-70 min; preferably, the concentration of the phosphoric acid solution is 4-10 wt. %, and the soaking time is 20-60 min; preferably, the concentration of the phosphoric acid solution is 6-8 wt. %, and the soaking time is 25-40 min; preferably, the concentration of the phosphoric acid solution is 10-12 wt. %, and the soaking time is 20-10 min.

In a class of this embodiment, the concave and convex stripes on the surface of the transition metal flakes comprise a plurality of convex stripes with the same direction or substantially the same direction, and concave stripes formed between two adjacent convex stripes; and/or, a plurality of convex stripes parallel or substantially parallel to each other, and concave stripes formed between two adjacent convex stripes; and/or convex stripes on the surface, which are formed by drawing or rolling the transition metal flakes as a basic material.

In a class of this embodiment, the transition metal flakes having convex stripes on the surface are subjected to pretreatment by grinding, polishing, degreasing, wire drawing, washing (with ethanol and deionized water), and then dried at 30-100° C. after pretreatment.

In a class of this embodiment, the transition metal flakes are one or more of aluminum-containing flakes, tin-containing flakes, nickel-containing flakes and titanium-containing flakes; the thickness of the transition metal flakes is not greater than 500 μm; preferably, the thickness is 50-300 μm; more preferably, the thickness is 200-300 μm.

In a class of this embodiment, the specific surface area of the base material is at least 5 times the specific surface area of the material before the corrosion control treatment.

In a class of this embodiment, the specific surface area of the base material is 2-20 m$^2$/g; the specific surface area of the material before the corrosion control treatment is 0.1-1 m$^2$/g.

In a class of this embodiment, the anodized material is dried in a drying oven at 35-90° C. for 3-24 h.

Figure 1A:
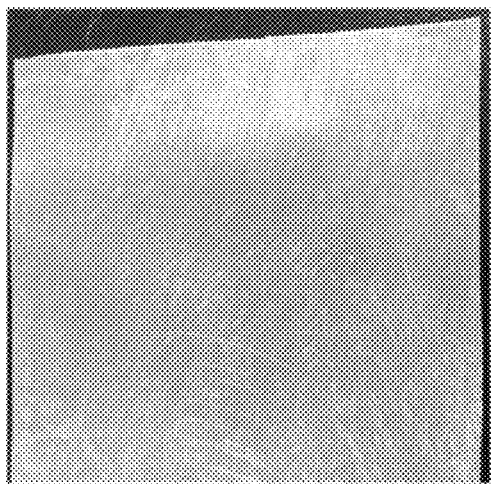
FIG. 1A shows a surface topography of a polished aluminum foil.

Reference numerals: 1, base material to be tested; 2, roller; 3, pressing plate, 4, structured surface (or may also be referred to as second structured layer); 410, first structural channel (or may also be called be referred to as first concave portion); 420, first protrusion portion; 421, hole; 422, second structural channel 5, base layer (or may also be referred to as first structural layer).

DETAILED DESCRIPTION

Materials

Transition Metal Flakes (or Foils) with Convex Stripes (Concave and Convex Stripes) on the Surface As far as the sampling of the "transition metal flakes (or foils) with convex stripes (concave and convex stripes) on the surface" is concerned, at least one surface of the "transition metal flakes" has convex stripes, and concave stripes with a cross-section of mesoscopic scale in width and depth are formed between two adjacent convex stripes, especially at the micron level ($10^{-6}$-$10^{-4}$ m); and if there are a plurality of convex stripes simultaneously, the direction of each stripe is identical or substantially identical, parallel or substantially parallel; there is no particular limitation on the source of stripes; for example, the source of source of stripes may be commercially available "transition metal flakes" with convex stripes on the surface; or may be obtained through grinding, wire drawing, and washing (with ethanol/acetone and deionized water) by using transition metal flakes as raw materials as shown in the embodiments herein, or obtained by rolling.

If the "transition metal flakes (or foils) with convex stripes on the surface" are obtained through grinding, wire drawing, and washing (with ethanol/acetone and deionized water) by using transition metal flakes as raw materials as shown in the embodiments herein, the transition metal flakes (before wire drawing treatment) only needs to meet one of the following properties: i) the transition metal content in the transition metal flakes is not less than 90%; ii) the thickness of the transition metal flakes is not more than 500 μm; preferably the thickness is 30-300 μm; more preferably, the thickness is 50-200 μm.

Figure 19:
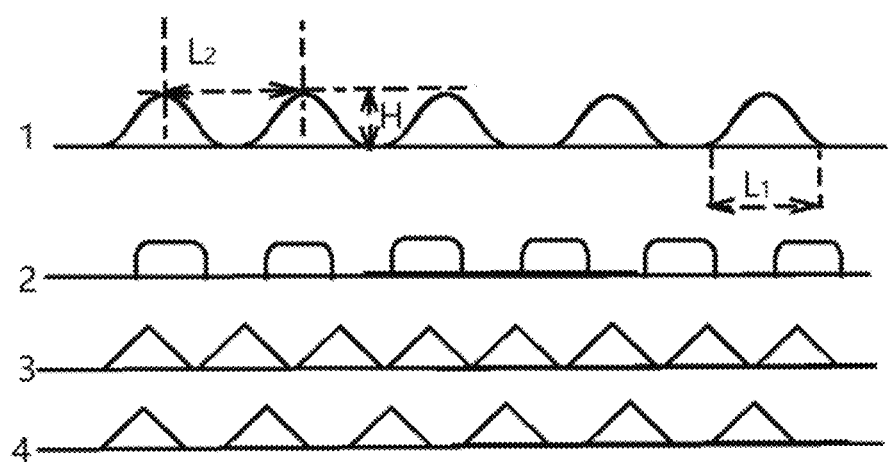
FIG. 19 shows a schematic view of a cross-sectional shape of convex stripes (concave stripes) on the surface of transition metal flakes.

It should be noted herein that, i) as shown in FIG. 19, the mesoscopic level size of the cross section mainly means that the width (or the maximum width) L1 of the convex stripes, the width L2 (or the maximum width or the maximum spacing between two adjacent stripes) of concave stripes, the height H of the convex stripes (or the maximum height or the maximum depth of the concave stripes) are in a mesoscopic level; ii) the characteristic scale of the mesoscopic level (mesoscopic scale) described herein is $10^{-9}$-$10^{-4}$ m, namely, from nanometer to micron scale.

Base Materials

A base material in the disclosure comprises a base layer, and a structured surface formed on the surface of the base layer; the structured surface comprises a) a first protrusion portion, and the first protrusion portion extends along a length direction of the structured surface; b) a first structural channel extending substantially in the same direction as the first protrusion portion and being adjacent to the first protrusion portion; and c) a plurality of holes distributed in the first protrusion portion and/or the first structural channel; at least 0.05% of the holes communicate with the adjacent first structural channel; the base material is flexible in at least one direction; the base material comprises at least one transition metal and the corresponding oxide of the transition metal; the base layer comprises transition metals and transition metal oxides, and the sum of contents thereof is at least 90% of the weight of the base layer; most of the transition metal oxides are concentratedly distributed on the structured surface.

Or, a base material in the disclosure comprises a first structural layer, and a second structural layer located on the surface of the first structural layer, and the second structural layer comprises a) a first protrusion portion, the first protruding portion extends along one length direction of the second structural layer; b) a first concave portion that extends substantially in the same direction as the first protrusion portion and is adjacent to the first protrusion portion; and c) a plurality of holes distributed in the first protrusion portion; at least 0.05% of the holes communicate with the adjacent first concave portions; the base material is flexible in at least one direction; the base material comprises at least one transition metal and the corresponding oxide of the transition metal; the content of the transition metal in the first structural layer is at least 90%, and the content of the oxide of the transition metal in the second structural layer is at least 30%, preferably not less than 90%.

Method

Pretreatment

In some embodiments, the "transition metal flakes (or foils) with concave and convex stripes on the surface" are obtained by using transition metal flakes as raw materials after wire drawing, washing treatment (with ethanol and deionized water) as shown in the embodiments herein. In the process of daily storage and transportation, the surface of the transition metal flakes is oxidized to form a natural oxide film, or is contaminated by contaminants such as grease and dust, or even has the problems of slight scratches, etc. Therefore, pretreatment should be performed before preparing the base material. The pretreatment is a well-known/ existing technical means, for example, the steps of cutting, high temperature annealing, degreasing, grinding, polishing, etc.

In some embodiments, the transition metal flakes need to be cut into samples of a certain size for later use. In some embodiments, high temperature annealing treatment at a certain temperature is required under the protection of an inert gas, and cooling of the furnace is carried out, to eliminate the internal stress of the transition metal flakes. For example, in one embodiment, the transition metal flake is an aluminum foil, which can be annealed at 450° C. for 5 h under the protection of inert gas argon, and cooled with the furnace, to eliminate the internal stress of the aluminum foils.

In some embodiments, mechanical grinding is used to remove possible scratches on the surface of the transition metal flakes. During the grinding process, a grinding tool is used to grind in a certain direction to form a polished surface with a consistent surface texture. After grinding, the thickness of the transition metal flakes is ensured to be not more than 500 μm; preferably, the thickness is 30-300 μm; and more preferably, the thickness is 50-200 μm.

In some embodiments, polishing can be adopted to produce a certain grinding effect on the aluminum alloy material, and remove the defects of burrs, oxide scales and scratches on the surface of the product, so as to reduce the surface roughness of the aluminum alloy material and obtain a bright appearance. The methods of polishing are well known to those skilled in the art, for example, mechanical abrasive polishing, chemical polishing, thermochemical polishing or electrolytic polishing. For example, in one embodiment, in order to make the surface of the sample to be sufficiently flat, the sample needs to be polished. The polishing is performed at 0° C. by using perchloric acid and absolute ethanol at a volume ratio of 1:4. In one embodiment, a mixed solution of 15% (mass fraction) sodium carbonate and 5% (mass fraction) sodium phosphate is used as a polishing solution, and the polishing is performed at a temperature of 60° C. and a voltage of 5V for 10 min, to finally obtain samples with a mirror effect.

In some embodiments, wax removal is used to remove polishing wax from the product. The method for removing wax is well known to those skilled in the art, for example, a wax remover is used to remove wax at a temperature of 70-80° C., the wax remover can be selected from commercially available zinc alloy wax remover (for example, Shangma zinc alloy wax remover). Preferably, ultrasonic waves can be used to enhance the wax removal effect.

In some embodiments, degreasing is required after polishing the transition metal flakes. The purpose of degreasing is to remove surface grease, dirt and polishing wax that has not been removed. The degreasing method can adopt various existing mature degreasing processes, for example, organic solvent degreasing, chemical degreasing, electrolytic degreasing, emulsification degreasing, ultrasonic degreasing, etc., as long as the purpose of removing oil stains on the surface of the transition metal flakes can be achieved; for example, in one embodiment, cathodic electrolysis may be used to remove oil in the degreasing fluid, then ultrasonic oil removal may be used to enhance the oil removal effect, and the frequency of the ultrasonic wave is 20-28 kHz. The degreasing fluid can be zinc alloy degreasing powder of Macdermet, Shangma or International Chemical Company. For another example, in one embodiment, the acetone solution is used as the degreasing fluid to remove oil in ultrasonic waves for 6 min. For another example, in one embodiment, a mixed solution of 0.5% (mass fraction) sodium hydroxide, 0.8% (mass fraction) sodium carbonate and 2% (mass fraction) sodium phosphate is selected as the degreasing fluid, and the oil is removed in ultrasonic waves for 6 min.

Figure 1B:
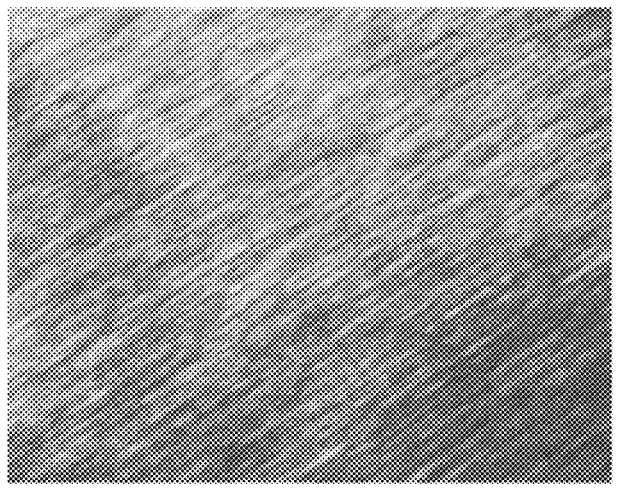
FIG. 1B shows an enlarged view of the surface topography of the aluminum foil after wire drawing.
Figure 1C:
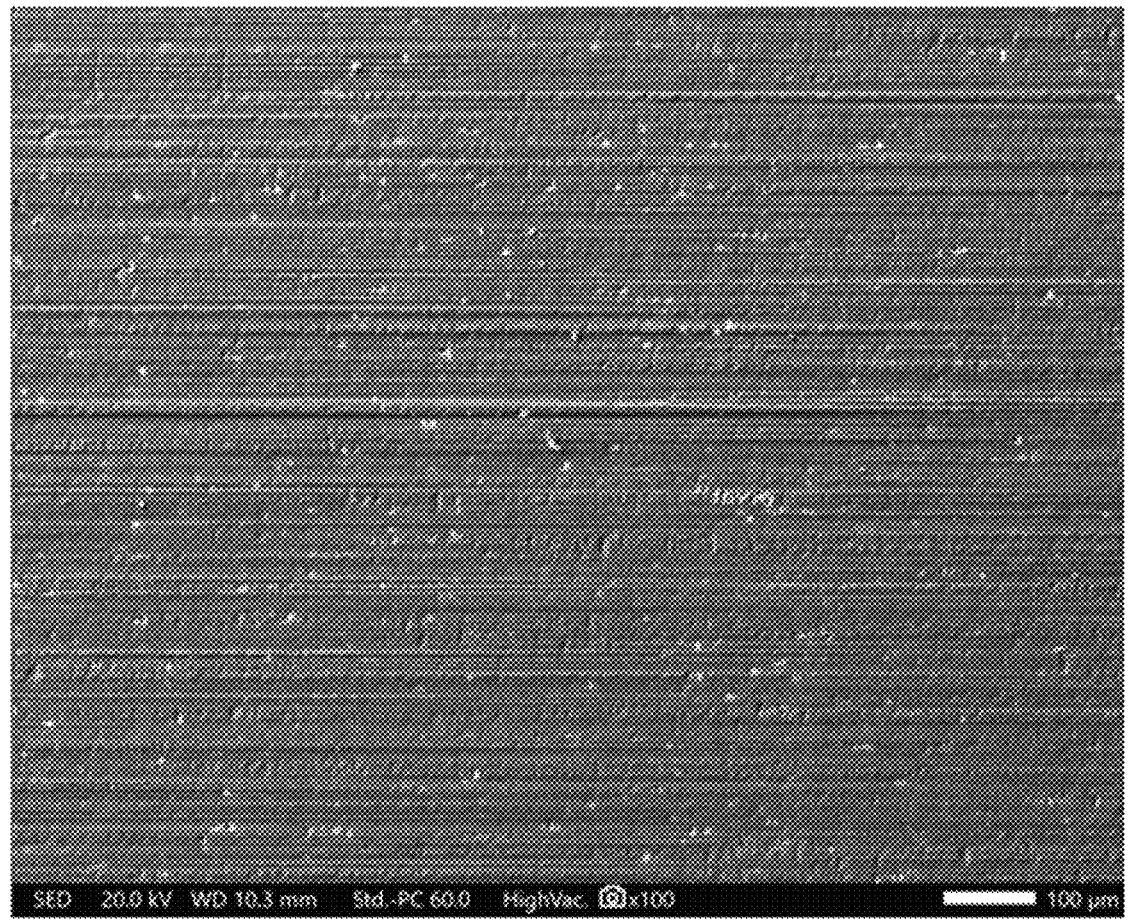
FIG. 1C shows a SEM image of the aluminum foil surface after wire drawing.

In some embodiments, the method of mechanical friction is used to perform wire drawing on at least one surface of the transition metal flakes, to form straight lines as shown in FIGS. 1A-1B, and continuous wire drawing is performed. After drawing, the transition metal flakes with "concave and convex stripes" are formed on the surface. In some embodiments, after wire drawing, a plurality of convex stripes with the same direction or approximately the same direction is formed on the surface of the transition metal flakes, and concave stripes are formed between two adjacent convex stripes. In some embodiments, after the wire drawing, a plurality of convex stripes that are parallel or substantially parallel to each other are formed on the surface of the transition metal flakes, and concave stripes are formed between two adjacent convex stripes. In some embodiments, after wire drawing, the maximum width of the convex stripes on the surface of the transition metal flakes is at least 10 nm, and the range may be 0.01-50 μm.

In some embodiments, after the wire drawing, the maximum depth of the concave stripes formed between two adjacent convex stripes on the surface of the transition metal flakes is at least 3 nm, and the range may be 0.001-10 μm. In some embodiments, after wire drawing, the maximum stripe spacing between two adjacent convex stripes on the surface of the transition metal flakes is at least 10 nm, and the range may be 0.01-50 μm.

In some embodiments, the transition metal flakes should be washed with alcohol and/or ketone and/or water after wire drawing, for further cleaning.

Preparation of Surface Hole Arrays of Transition Metal Flakes

Hole arrays (holes with aperture of mesoscopic scale) can be formed on the surface of transition metal flakes by adopting any existing technologies, for example, the method for producing highly ordered nanopillars or nanoporous structures on large areas disclosed in the patent with publication number CN103402908B (publication date: 2016 Aug. 31), and for another example, anodization method.

In some embodiments, after the "transition metal flakes with concave and convex stripes on the surface" are treated by conventional anodization, an array of holes with aperture of mesoscopic scale distributed along the stripe direction is formed on the surface of the transition metal flakes.

In some embodiments, the transition metal flakes are used as the anode to connect to the positive pole of the external power supply, and is placed in the electrolyte solution, and the cathode can be made of materials that are not easy to react with acid, such as Pt sheet, titanium plate, stainless steel, and stone grinding rod, etc.

In some embodiments, the anodizing electrolyte is at least one acid solution selected from oxalic acid, sulfuric acid, phosphoric acid or hydrofluoric acid, and the concentration of the acid is 10-150 g/L. During the anodizing process, it is required to place a reaction vessel containing the anodizing electrolyte in an ice-water bath, and keep the temperature of the anodizing electrolyte in the vessel between 0 and 15° C.;

It has been found that the applied voltage will affect the structure of the oxide film (i.e. the hole layer) during the anodization of transition metals. Under a voltage within a certain range, the higher the voltage, the more uniform and denser the obtained oxide film will be. In a preferred embodiment, the voltage is in the range of 10-200 V, for example, 10-30 V, 20-30 V, 30-50 V, 30-80 V, 40-80 V, 100-120 V.

In some embodiments, the anodizing electrolyte is an oxalic acid solution, the oxalic acid concentration is 10-80 g/L, the oxidation time during anodization is 6-12 hours, and the voltage is 30-80 V; in some embodiments, the anodizing electrolyte is a sulfuric acid solution, the concentration of sulfuric acid is 10-100 g/L, the oxidation time during anodization is 2-16 hours, and the voltage is 10-30 V; in some embodiments, the anodizing electrolyte is a phosphoric acid solution, the concentration of phosphoric acid is 30-150 g/L, the oxidation time during anodization is 1-10 hours, and the voltage is 100-120 V; in some embodiments, the anodizing electrolyte is a hydrofluoric acid solution, and the concentration of hydrofluoric acid is 10-20 g/L, the oxidation time during anodization is 2-6 hours, and the voltage is 20-30 V.

Figure 2A:
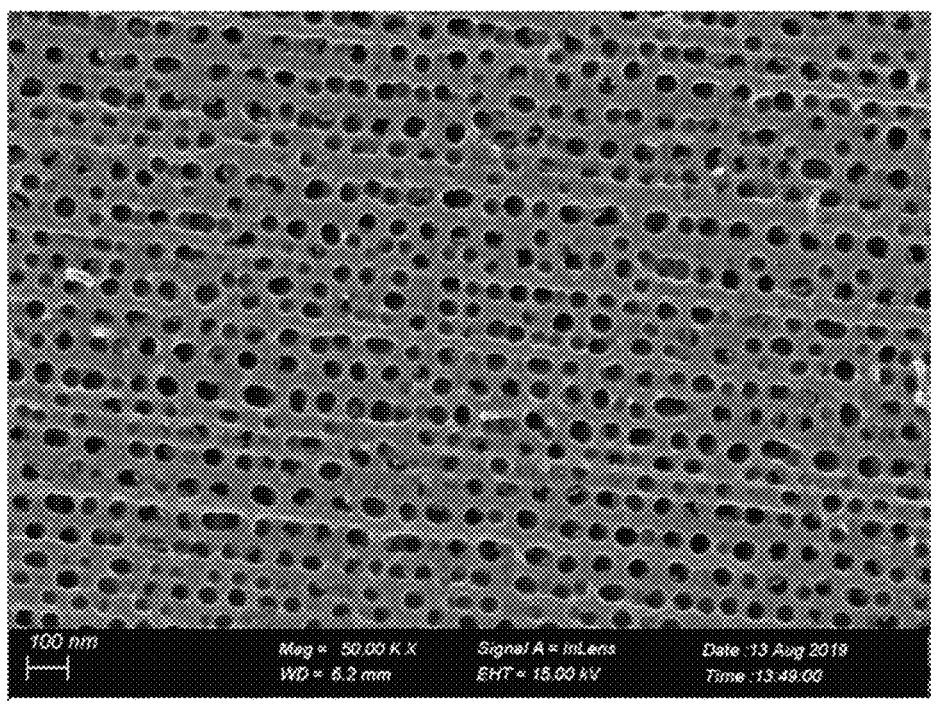
FIG. 2A shows a SEM image of a pore structure on the surface of transition metal aluminum foils after the element loading of Example 1 of the disclosure after anodization.
Figure 3:
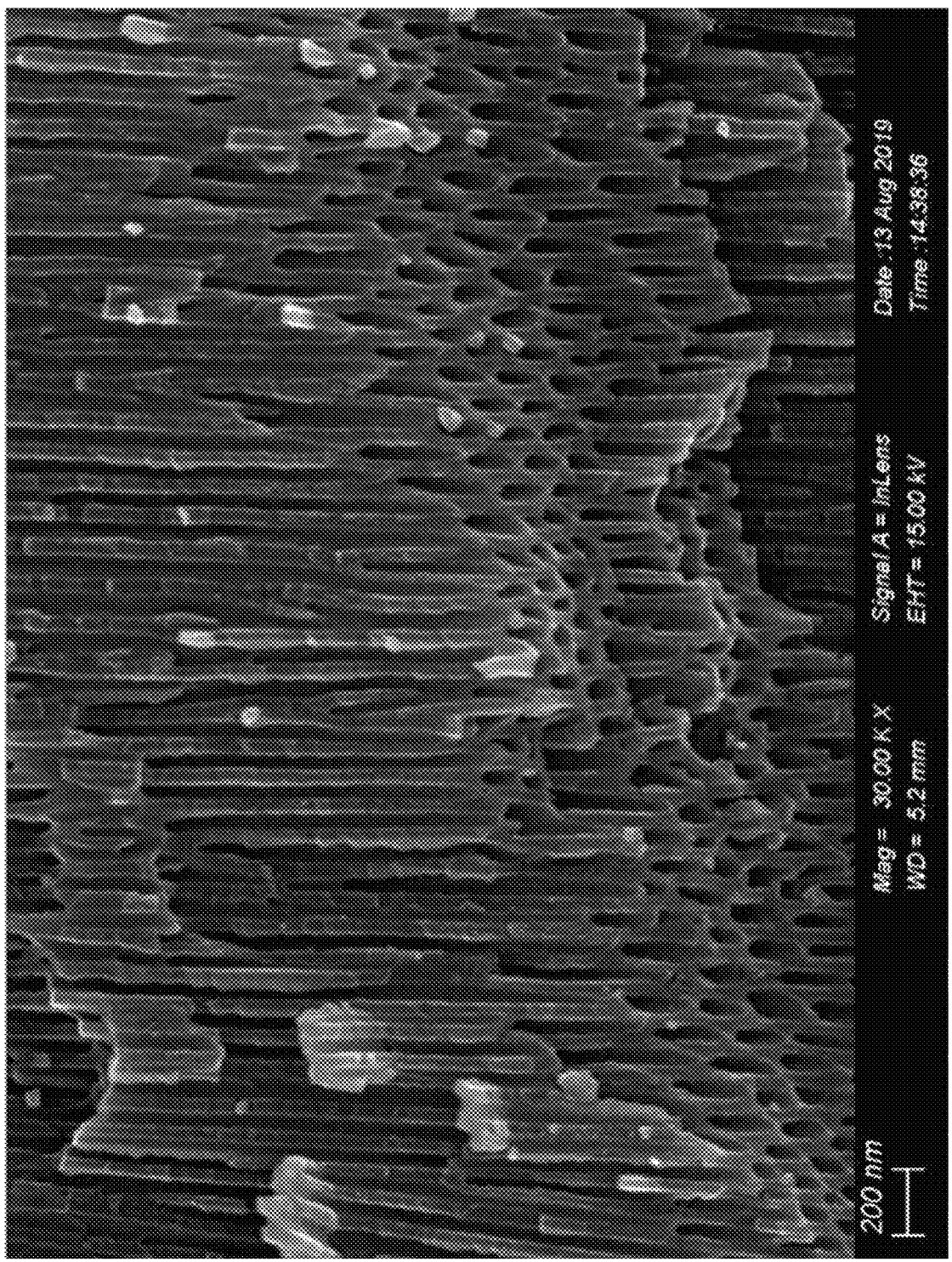
FIG. 3 shows a SEM image of the pore layer of the cross section of transition metal aluminum foils of Example 1 of the disclosure after anodization.

In some embodiments, after anodization, an ordered porous anodic oxide film as shown in FIG. 2A and FIG. 3 is formed on the surface of the transition metal flakes. In some embodiments, the depth of the holes is at least 20 nm, and is in the range of 0.02-80 μm. In some embodiments, the average aperture of the holes is at least 10 nm, and is in the range of 10-500 nm. In some embodiments, the wall thickness of holes (between two adjacent holes) is at least 5 nm, and is in the range of 5-100 nm.

Etching Control

The surface of transition metal flakes having a hole array (holes with an aperture of mesoscopic scale) can be etch-controlled by using any prior art, for example, alkaline etching, or acid etching.

In some embodiments, the surface of transition metal flakes having a hole array (holes with an aperture of mesoscopic scale) can be etch-controlled by using a conventional acid etching method, so that the holes on the surface of the transition metal flakes are changed, for example, at least 5% of the holes are in communication with adjacent holes to form irregular holes, and for another example, at least 0.05% of the holes are in communication with the adjacent first structural channels thereof.

In some embodiments, the hydrogen ion concentration in the acid solution for the acid etching control is 0.001-0.65 mol/L; when the acid etching control is performed, the time of acid etching is 5-70 min. In some embodiments, the pH of the electrolyte in the acid etching control may be 0.92-3.00; when the acid etching control is performed, the acid etching is 5-70 min.

Figure 4A:
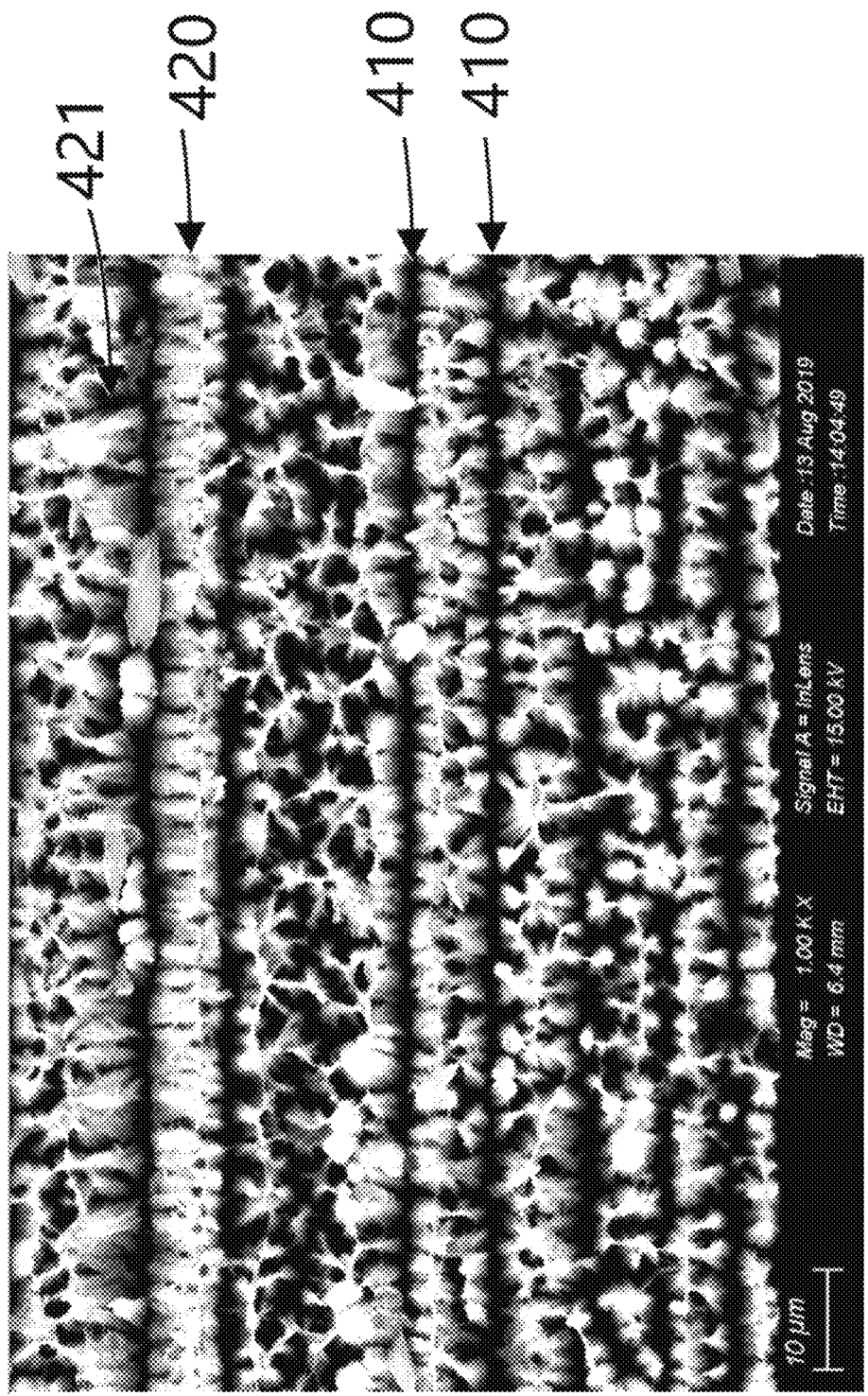
FIG. 4A shows an overall topography of a surface of material in Example 1 obtained through anodization, acid etching control and element loading by using transition metal aluminum foils as base materials.

In some embodiments, the ordered porous anodic oxide film obtained by anodization is subjected to acid etching, to obtain a base material as shown in FIG. 4A.

In some embodiments, the final prepared base material has a bulk density of not higher than 1 g/cm$^3$; in some embodiments, the bulk density of the base material is 0.1-0.5 g/cm$^3$. In some embodiments, the base material has an apparent density of not less than 1 g/cm$^3$ and a porosity of not less than 5%; in some embodiments, the porosity is 5-30%.

Test

Bending Test

Figure 15:
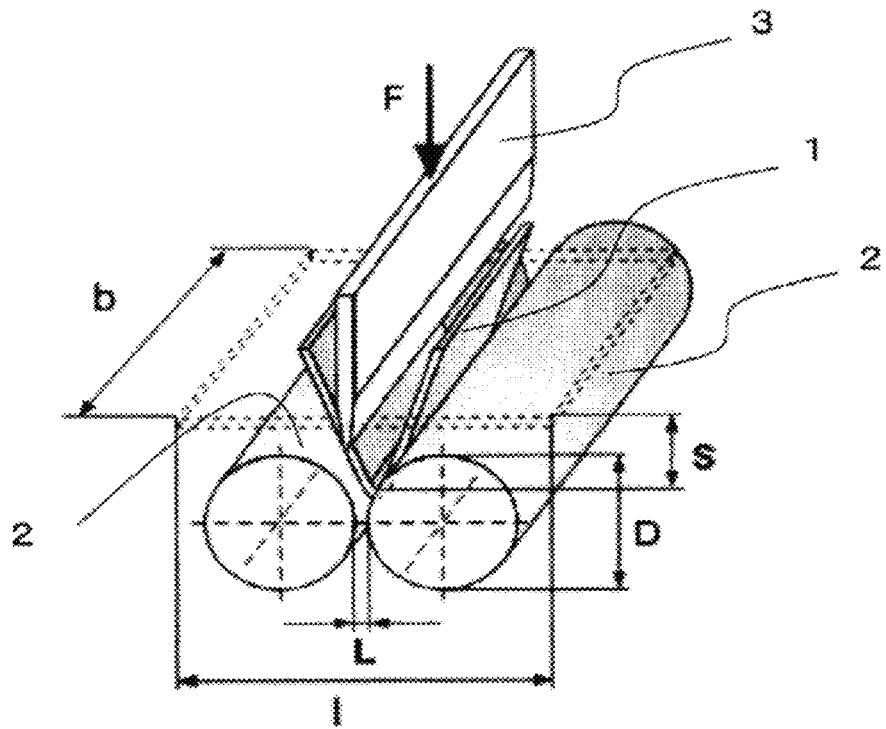
FIG. 15 shows a perspective view of the method of the flexibility test (bending test) on the base material in the disclosure.
Figure 16A:
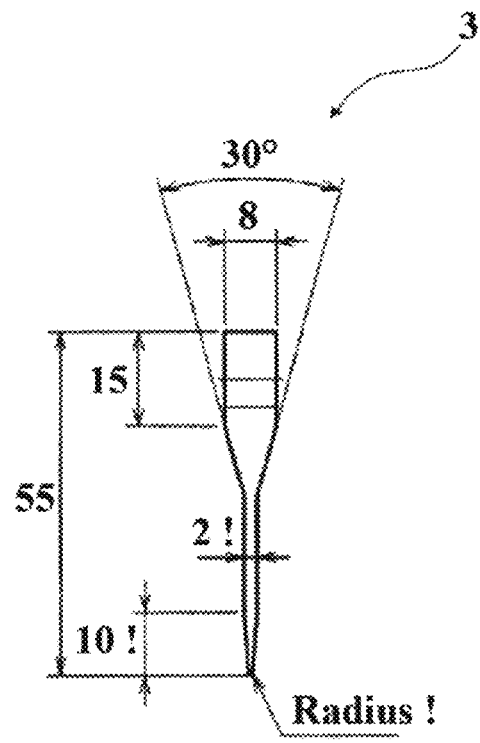
FIG. 16A shows a front view and FIG. 16B shows a side view of the pressing plate of FIG. 15.
Figure 16B:
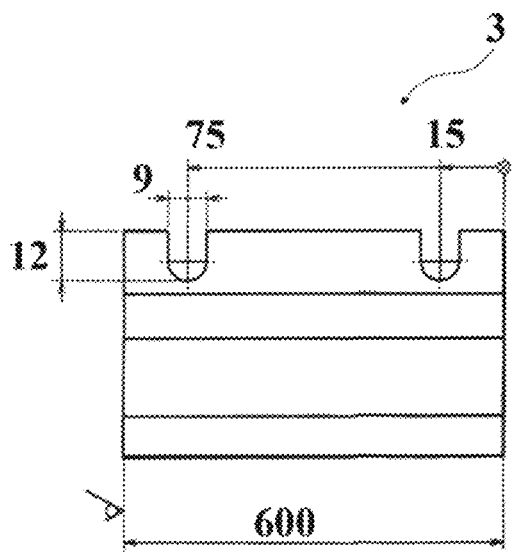

The bending angle β of the base material can be tested by the following method. As shown in FIG. 15, it is a perspective view of a bending test. FIG. 16A and FIG. 16B show a front view and a side view of a pressing plate 3 as a plate-shaped bending fixture respectively.

The method is as follows. First, in 2 rollers 2 arranged in parallel and provided with a roll opening L, a base material 1 to be tested is horizontally placed on the positions relative to the rollers 2 with equal distance on the left and right, as shown in the dotted lines in FIG. 15.

Next, above the base material 1 to be tested, a pressing plate 3 serving as a bending fixture for the base material 1 to be tested is placed in a manner of standing vertically relative to the base material 1 to be tested. Specifically, the edge of the front end of the pressing plate 3 is placed at the center of the roll opening L, and the rolling direction of the base material 1 to be tested and the extending direction of the pressing plate 3 of the base material 1 to be tested are orthogonal to each other. The roller 2, the base material 1 to be tested and the pressing plate 3 are placed in this way.

Then, the pressing plate 3 is pushed to the center of the base material 1 to be tested from above, and a load F is applied, so that the base material 1 to be tested is bent (punched) toward the aforementioned narrow roll opening L, and the central portion of the base material to be tested that is bent and deformed is pressed into the narrow roll opening.

At this time, the angle of the outer side of the curve of the central portion of the base material 1 to be tested (angle formed by the extended line of the outer tangent of the base material 1 to be tested) when the load F applied from the upper pressing plate 3 reaches the maximum is taken as the bending angle β(°) and is measured. The flexibility is evaluated by the bending angle. Namely, the larger the bending angle, the better the flexibility of the base material 1 to be tested.

As the test conditions of the bending test, the size of the base material 1 to be tested is 5 cm×5 cm×0.01 mm (length×width×thickness), the diameters D of the two rolls 2 are 20 mm, and the roll opening L is 2.0 times the thickness of the base material 1 to be tested. S is the pressing depth of the central portion of the base material to be tested into the roll opening when the load F reaches the maximum.

Figure 17A:
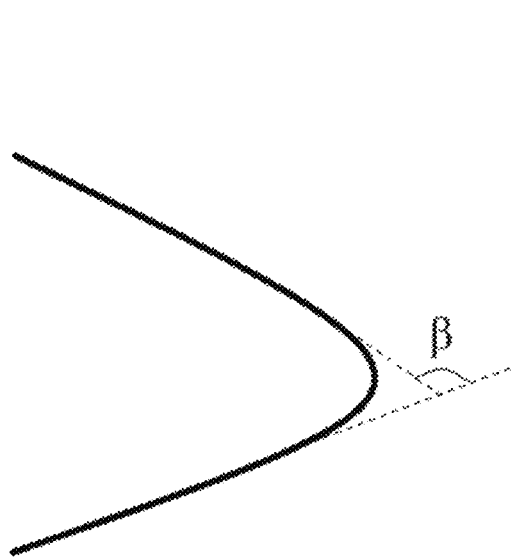
FIG. 17A shows a schematic view of the measurement of the bending angle (3.
Figure 17B:
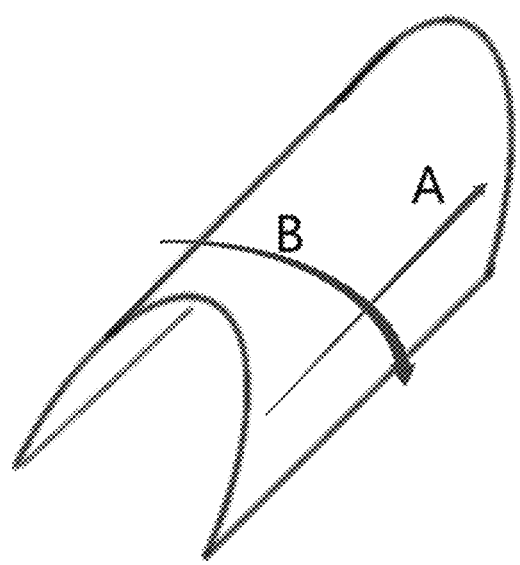
FIG. 17B shows a schematic view of the flexible orientation direction B of the base material and the extension direction A of the concave and convex stripes.

As shown in FIG. 16B, the length of the side of the pressing plate 3 that is in contact with the base material 1 to be tested is 600 mm, and the lower end side (tip) in contact with the central portion of the base material 1 to be tested is as shown in FIG. 17A when viewed from the front, which is a sharp cone with a radius r of 0.2 mmφ.

As shown in FIG. 16B on the opposite side of the tip of the pressing plate 3, two recesses with a width of 9 mm and a depth of 12 mm are formed, and the recesses are embedded into an overload device (not shown in the figure), and are configured so that the pressure plate 3 applies a load to the base material 1 to be tested.

Or, a test can be conducted with reference to the national standard GB3356-1982.

Apparent Density Test

The testing is conducted in accordance with GBT6343-2009 *Cellular plastics and rubbers—Determination of apparent density*.

Bulk Density Test

Bulk density ($\rho b$, $g/cm^3$) refers to the mass per unit volume of the material to be tested in the bulk state. Before conducting a bulk density test, a base material is cut into a size of 0.1 mm×0.5 mm×0.5 mm; for the specific method, refer to ASTM D7481-2009 Standard Test Methods for Determining Loose and Tapped Bulk Densities of Powders using a Graduated Cylinder.

Bulk density: $\rho b = m/V$.

m—the mass of the material to be tested in the graduated cylinder, in grams (g);

V—the bulk volume of the material to be tested, in milliliters (mL), including the volume of the material itself and the volume of voids between the materials (the voids within the material can be ignored).

It should be noted that the mass m can be measured by a balance;

The volume V can be measured by the following way:

By naturally filling a container with a certain volume until it is full, the volume of the container is the bulk volume of the material to be tested. The natural filling is specifically as follows: the material to be tested falls into the container naturally until the container is filled from a place with a vertical height of not more than 10 cm form the container inlet, without any tapping and pressing operations.

SEM Topography

The surface morphology is characterized by JSM-IT500HR scanning electron microscope, and the SEM image is obtained.

It should be noted that in the disclosure, when the scanning electron microscope is used to observe the morphology of the base material, the surface of the base material is loaded with active components, to improve the observation effect. The loading of active components can effectively improve the electron response of the surface of the base material, which is conducive to SEM imaging. In addition, after the active components are loaded, the morphology of the base material will not be changed. For the loading method, please refer to the following part: Preparation of Two-Dimensional Ozone Catalytic Materials.

Application

The base materials described above can have many applications. Such applications can include, but are not limited to: catalysts, directly using a carrier for a catalytic process in a specific situation (for example, a nickel catalyst); adsorbents, directly using a carrier for an adsorption process in a specific situation (for example, alumina defluorination); carrier materials, for example, catalyst carriers, absorbent carriers.

Particularly, in some embodiments, the above base materials can be used as a carrier to prepare a two-dimensional ozone catalytic material. The prepared catalyst material has the physical properties of light weight and flexibility, and the chemical properties of high interfacial mass transfer efficiency and good catalytic performance, and can be used in many fields such as waste water and waste gas.

Preparation of Two-Dimensional Ozone Catalytic Materials

Pre-treatment: The base material stored in clean water after the acid etching control is dried in a 50° C. drying oven for future use;

Preparation of a precursor solution: the solution consists of 50 g/L glucose, 50 g/L manganese sulfate (5 g), 20 g/L copper nitrate, 50 g/L cobalt chloride and 80 g/L acetic acid.

Two-dimensional ozone catalytic materials are prepared. The specific steps are as follows: A. placing the above base material into the above precursor solution for vacuum impregnation (the volume of the precursor solution measured in this step can completely immerse the foils), the immersion time is 20 min, the temperature is constant at 20±5° C., and the precursor salt synchronously corrodes the two-dimensional base material during the immersion process;

B. placing the base material after dipping and loading at room temperature for 15 h;

C. placing the base material after the precursor is fully diffused in a vacuum oven at 70° C. for drying and pre-pyrolysis for 15 h;

D. placing the base material after drying and pre-pyrolysis in an argon protective furnace for high-temperature calcination treatment; heating to 550° C. at a rate of 3° C./min, and holding for 1.5 h, then cooling to room temperature at a rate of 3° C./min, to obtain a corresponding two-dimensional ozone catalytic material (hereinafter referred to as two-dimensional ozone catalytic material).

Semi-Continuous Flow Ozone Catalytic Oxidation Test

Figures 14A, 14B:
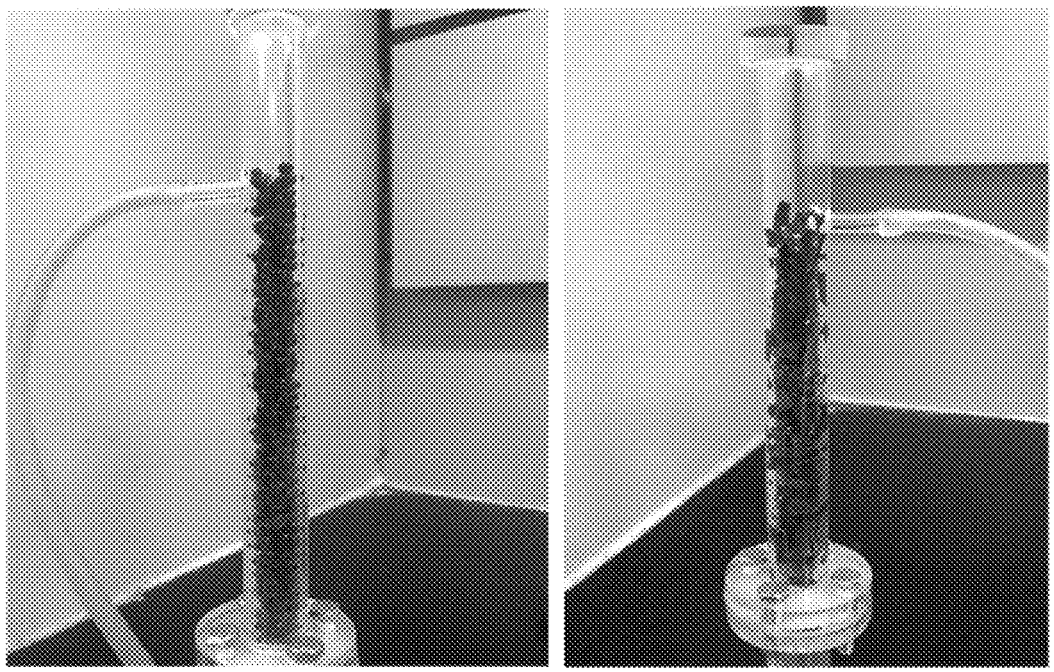
FIG. 14A shows a reactor for packing a catalyst in the semi-continuous flow ozone catalytic oxidation experiment and a reactor for packing the traditional three-dimensional particle catalyst (20 g)
FIG. 14B shows a reactor for packing the catalyst (4 g) formed by using the base material prepared by the disclosure as a matrix.

A semi-continuous flow ozone catalytic oxidation test is conducted according to the following conditions. As shown in FIG. 14, a catalyst material is loaded into a reaction reactor, and the filling height should be identical when different types of catalysts are used for the loading of the reactor; in the disclosure, when conventional granular catalysts are used for loading, the dosage is 20 g, and the dosage of other types of catalysts is 4 g.

Test group: catalyst+ozone, including conventional granular catalysts, catalysts prepared in the disclosure (it needs to be cut into a size with a side length of 1-3 mm);

Blank control: no catalyst, only ozone;

Water body to be treated: three types according to different types of simulated contaminants (phenol, pyrazole, oxalic acid) in the water body to be treated; specifically: water body to be treated with simulated contaminants of phenol and pyrazole with a volume of 500 mL; water body to be treated with simulated contaminant of oxalic acid with a volume of 200 mL; and simulated contaminant with a concentration of 100 mg/L;

Sampling time: the water samples at different time points are tested during the catalytic ozone oxidation reaction; of which, phenol (water samples at the time points of 0, 2.5, 5, 7.5, 10, 15 min), pyrazole (water samples at the time points of 0, 2.5, 5, 7.5, 10, 15, 20, 30, 45 and 60 min), oxalic acid (water samples at the time points of 0, 2.5, 5, 7.5, 10 and 15 min).

Steps/Methods of Semi-Continuous Flow Ozone Catalytic Oxidation Test 1) performing ozone aeration in a simulated water body containing contaminants, where the inflow rate of ozone is 0.5 L/min, and the inflow concentration is 5 mg/L;

2) feeding the ozone-dissolved solution into a reactor, and returning the effluent to the solution, where the recycling time for the treatment of the water body to be treated with a simulated contaminant of phenol is 15 min, the recycling time for the treatment of the water body to be treated with a simulated contaminant of pyrazole is 60 min, and the recycling time for the treatment of the water body to be treated with a simulated contaminant of oxalic acid is 15 min.

The following examples are intended to illustrate certain embodiments but not to illustrate the full scope of the invention. The term "structured surface" mentioned in the whole text of the disclosure can also be referred to as the "second structural layer", and both have the same meaning; similarly, the term "first structural channel" mentioned in the whole text of the disclosure can also be referred to as the "first concave portion", and both have the same meaning; the "base layer" mentioned in the whole text of the disclosure can also be referred to as the "first structural layer", and both have the same meaning.

Example 1

In this example, a transition metal aluminum foil with a thickness of 200 μm was selected as the basic material to prepare a base material; the specific steps were as follows:
1) wire drawing: As shown in FIG. 1A, aluminum foils (upper and lower surfaces) were subjected to high temperature annealing, degreasing, grinding and polishing pretreatment, then subjected to wire drawing treatment, so that a plurality of basically parallel convex stripes with a width of about 50±10 nm were formed on the upper and lower surfaces of the transition metal aluminum foils, and concave stripes with a depth of 1 nm and a width of 50±10 nm were formed, and then washing was performed using ethanol and deionized water respectively, after washing, drying was performed in a drying oven at 50° C. for later use. The obtained materials after wire drawing had a surface as shown in FIG. 1B;
2) Anodizing: Anodizing was carried out by taking a titanium plate as a cathode, a pretreated aluminum foil as an anode, and 50 g/L of oxalic acid solution (300 ml) as a corrosion electrolyte. During the anodizing process, the reaction vessel containing the corrosion electrolyte was always placed in an ice-water bath, with a temperature kept at 10±1° C.; during the anodization, the spacing between the anode and cathode electrodes was 2 cm, the voltage was 60 V, and the treatment time was 12 hours; the aluminum foils after oxidation were cleaned and placed in deionized water for preservation;

A nanopore array was prepared on the anodized aluminum foil (hereinafter referred to as 0.5A), and its surface microstructure was shown in FIG. 2A, and its cross-sectional microstructure was shown in FIG. 3. As shown from FIG. 2A, after the aluminum foil with concave and convex stripes on the surface was anodized, there was a plurality of nanopores distributed on the surface (upper and lower surfaces) of the two-dimensional material, and these nanopores were distributed in a regular form of nanopore arrays according to the direction of the stripes under the guidance of the concave and convex stripes;
3) Acid etching control: the anodized aluminum foil was dried in a drying oven at 50° C. for 12 h; under room temperature, 500 ml of 4 wt. % phosphoric acid solution (the molar concentration of hydrogen ions of $3.2\times10^1$ mol/L, and the pH of 2.50) was prepared; subsequently, the dried aluminum foil was soaked in phosphoric acid solution for softening for 60 min; during which, the phosphoric acid solution was placed in a drying oven at a constant temperature of 35° C. for preservation; after the acid etching control was completed, the base material (hereinafter referred to as 1A) was cleaned with deionized water, and stored in clean water.

Figure 2B:
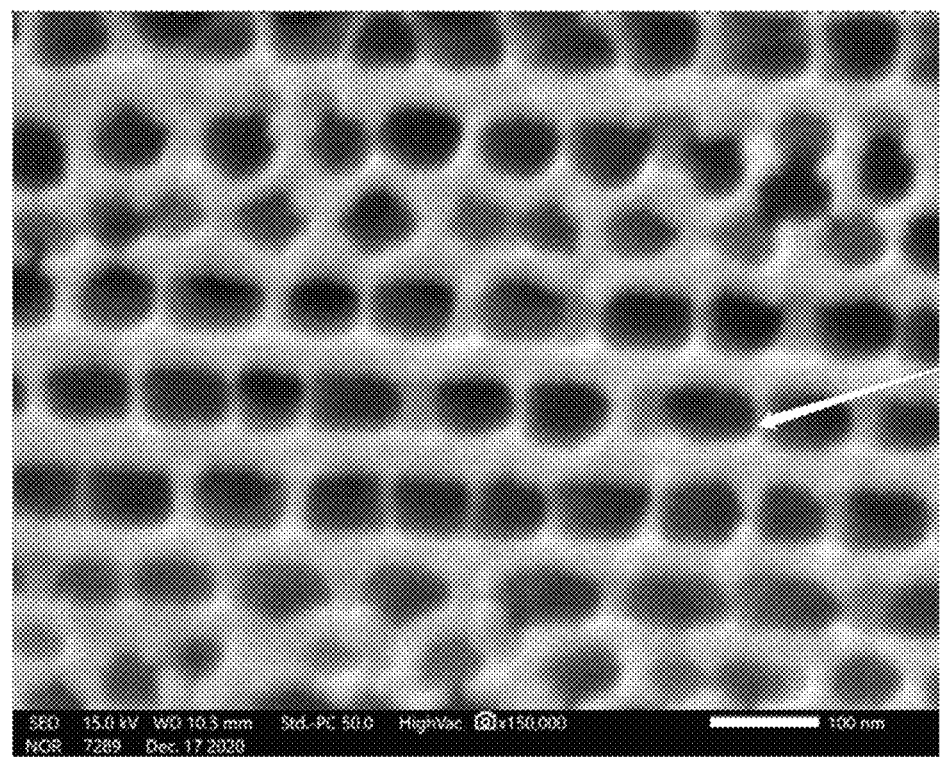
FIG. 2B shows a SEM image of the change process of the hole walls of transition metal aluminum foils after the element loading during the etching treatment process (not completed)

The microstructure of the aluminum foil surface was observed during the acid etching control. As shown in FIG. 2B, the hole wall along the extension direction of the concave and convex stripes (or the length direction of the nanopore array) has become thinner obviously.

Figure 4B:
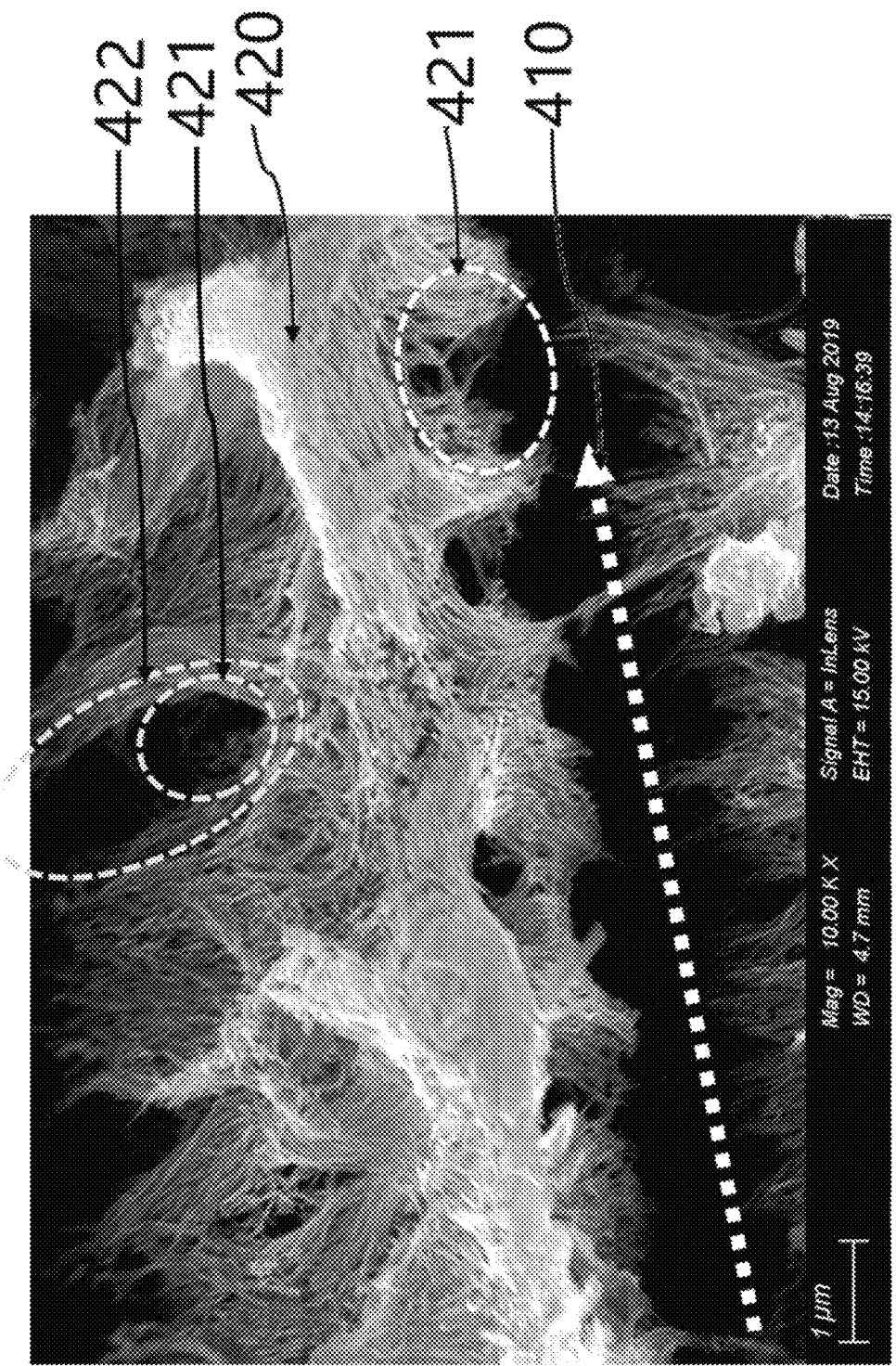
FIG. 4B shows an enlarge view of the first structure channel and the second structural channel.

The base material prepared in this example had a base layer 5, and the upper and lower surfaces of the base layer 5 had a structured surface 4 as shown in FIG. 4A. There is a plurality of obvious first structural channels 410 with a substantially consistent direction and a first protrusion portion 420 located between two adjacent first structural channels 410 on the structured surface 4; meanwhile, obviously, a large number of holes 421 are distributed on the first protrusion portion 420, at least 0.05% of the holes 421 communicate with the adjacent first structure channels 410 to form second structural channels 422. FIG. 4B showed a partial enlarged view. As shown from the figure, the first structure channel 410, the first protrusion portion 420, the hole 421 and the second structure channel 422 could be clearly seen for the structured surface 4. Further, FIG. 4C was a partial enlarged view of the first protruding portion 420. From the figure, the wall surface morphology and the change of the holes formed on the anodic oxide film after corroding could be clearly seen.

In this example, for the prepared base material, the aluminum content of the base layer 5 (or the first structural layer) was not less than 90%, the aluminum oxide content of the structured surface 4 (or the second structural layer) was higher than 30%, the bulk density was about 0.5 g/cm$^3$, and the apparent density was about 2 g/cm$^3$.

Example 2

In this example, a two-dimensional transition metal tin foil with a thickness of 300 μm and convex stripes (the width of the convex stripes of about 60 nm, the depth of the concave stripes of 4 nm, and the spacing between two adjacent concave stripes of 60 nm (namely, the width of the concave stripes)) was used as a basic material to prepare the base material; the specific steps were as follows:
1) Pretreatment: the two sides of the tin foil were pretreated by degreasing and washing with water. The degreasing was performed using acetone solution, and the washing was performed using ethanol and deionized water respectively. After washing, drying was performed in a drying oven at 50° C. for later use;
2) Anodizing: Anodizing was carried out by taking a titanium plate as a cathode, a pretreated tin foil as an anode, and 70 g/L of sulfuric acid solution (300 ml) as a corrosion electrolyte. During the anodizing process, the reaction vessel containing the corrosion electrolyte was always placed in an ice-water bath, with a temperature kept at 10±1° C.; during the anodization, the spacing between the anode and cathode electrodes was 1 cm, the voltage was 15V, and the treatment time was 12 hours; the tin foil after oxidation was cleaned and placed in deionized water for preservation;
3) Acid etching control: the anodized tin foil was dried in a drying oven at 50° C. for 12 h; under room temperature, 500 ml of 7 wt. % phosphoric acid solution (the molar concentration of hydrogen ions of $5.60\times10^{-3}$ mol/L, and the pH of 2.25) was prepared; subsequently, the dried tin foil was soaked in phosphoric acid solution for softening for 30 min; during which, the phosphoric acid solution was placed in a drying oven at a constant temperature of 35° C. for preservation; after the acid etching control was completed, the base material (hereinafter referred to as 2A) was cleaned with deionized water, and dried in a drying oven at 50° C.

Figure 5:
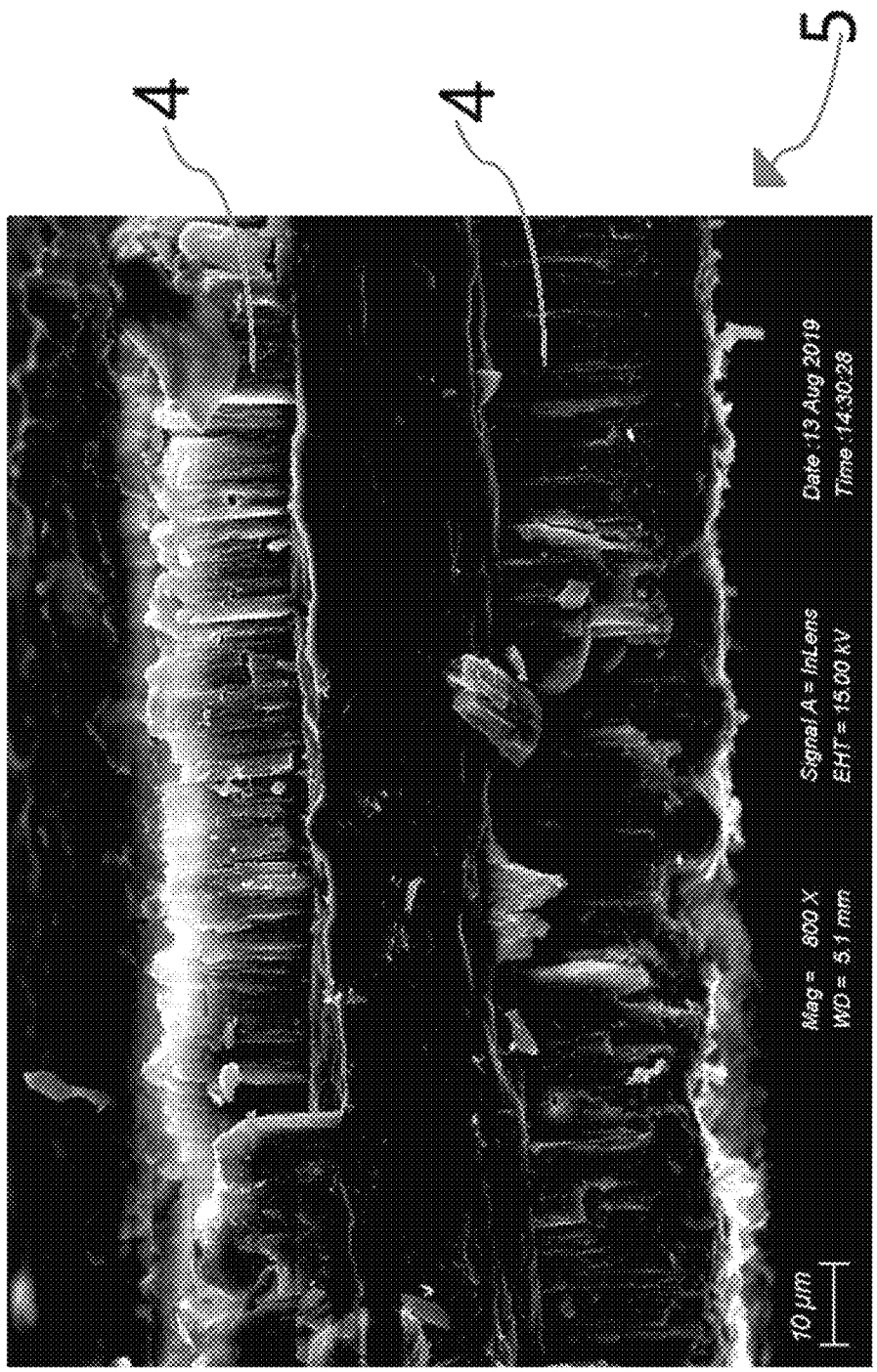
FIG. 5 shows a cross-sectional topography of a material in Example 2 obtained through anodization, acid etching control and element loading by using transition metal tin as the base material.

As shown in FIG. 5, the base material prepared in this example has a base layer 5, and the upper and lower surfaces of the base layer 5 both have a structured surface 4.

Example 3

In this example, a two-dimensional transition metal nickel foil with a thickness of 100 μm and concave and convex stripes (the width of the convex stripes of about 100 nm, the depth of the concave stripes of 4 nm, and the width of 100 nm) was used as a basic material to prepare the base material; the specific steps were as follows:
1) Pretreatment: the two sides of the nickel foil were pretreated by degreasing and washing with water. The degreasing was performed using acetone solution, and the washing was performed using ethanol and deionized water respectively. After washing, drying was performed in a drying oven at 40° C. for later use;
2) Anodizing: Anodizing was carried out by taking a titanium plate as a cathode, a pretreated nickel foil as an anode, and 120 g/L of phosphoric acid solution (300 ml) as a corrosion electrolyte. During the anodizing process, the reaction vessel containing the corrosion electrolyte was always placed in an ice-water bath, with a temperature kept at 10±1° C.; during the anodization, the spacing between the anode and cathode electrodes was 1.5 cm, the voltage was 100 V, and the treatment time was 9 hours; the nickel foil after oxidation was cleaned and placed in deionized water for preservation;
3) Acid etching control: the anodized nickel foil was dried in a drying oven at 50° C. for 12 h; under room temperature, 500 ml of 10 wt. % phosphoric acid solution (the molar concentration of hydrogen ions of $8.1 \times 10^{-3}$ mol/L, and the pH of 2.09) was prepared; subsequently, the dried nickel foil was soaked in phosphoric acid solution for softening for 20 min; during which, the phosphoric acid solution was placed in a drying oven at a constant temperature of 35° C. for preservation; after the acid etching control was completed, the base material (hereinafter referred to as 3A) was cleaned with deionized water, and dried in a drying oven at 50° C.

Example 4

In this example, a two-dimensional transition metal titanium foil with a thickness of 100 μm and convex stripes (the width of the stripes of about 60 nm, the depth of the stripes of 4 nm, and the spacing between stripes of 60 nm) was used as a basic material to prepare the base material; the specific steps were as follows:
1) Pretreatment: the two sides of the titanium foil were pretreated by degreasing and washing with water. The degreasing was performed using acetone solution, and the washing was performed using ethanol and deionized water respectively. After washing, drying was performed in a drying oven at 40° C. for later use;
2) Anodizing: Anodizing was carried out by taking a stainless steel plate as a cathode, a pretreated titanium foil as an anode, and 10 g/L of hydrofluoric acid solution (300 ml) as a corrosion electrolyte. During the anodizing process, the reaction vessel containing the corrosion electrolyte was always placed in an ice-water bath, with a temperature kept at 10±1° C.; during the anodization, the spacing between the anode and cathode electrodes was 1.5 cm, the voltage was 25 V, and the treatment time was 6 hours; the titanium foil after oxidation was cleaned and placed in deionized water for preservation;
3) Acid etching control: the anodized titanium foil was dried in a drying oven at 50° C. for 12 h; under room temperature, 500 ml of 7 wt. % chromic acid solution (the molar concentration of hydrogen ions of 0.63 mol/L, and the pH of 0.94) was prepared; subsequently, the dried titanium foil was soaked in chromic acid solution for softening for 25 min; during which, the chromic acid solution was placed in a drying oven at a constant temperature of 35° C. for preservation; after the acid etching control was completed, the base material (hereinafter referred to as 4A) was cleaned with deionized water, and dried in a drying oven at 50° C.

Comparative Example 1 about Concave and Convex Stripes

This comparative example was basically the same as Example 1, with the only difference as follows: in the step 1), the aluminum foil (upper and lower surfaces) was subjected to high temperature annealing, degreasing, grinding, and pre-polishing treatment, and then washed with ethanol and deionized water respectively, and after washing, drying was performed in a drying oven at 50° C. for later use; there was no wire drawing during the whole process, namely, the upper and lower surfaces of the transition metal aluminum foil had a smooth mirror structure, and basically had no a plurality of convex stripes with a width of about 50±10 nm and concave stripes with a depth of 3±1 nm and a width of 50±10 nm that were basically parallel. The rest were the same as those in Example 1. The base material prepared in this comparative example was named as 1C.

Comparative Example 2 about Etching Parameter Control

Figure 6A:
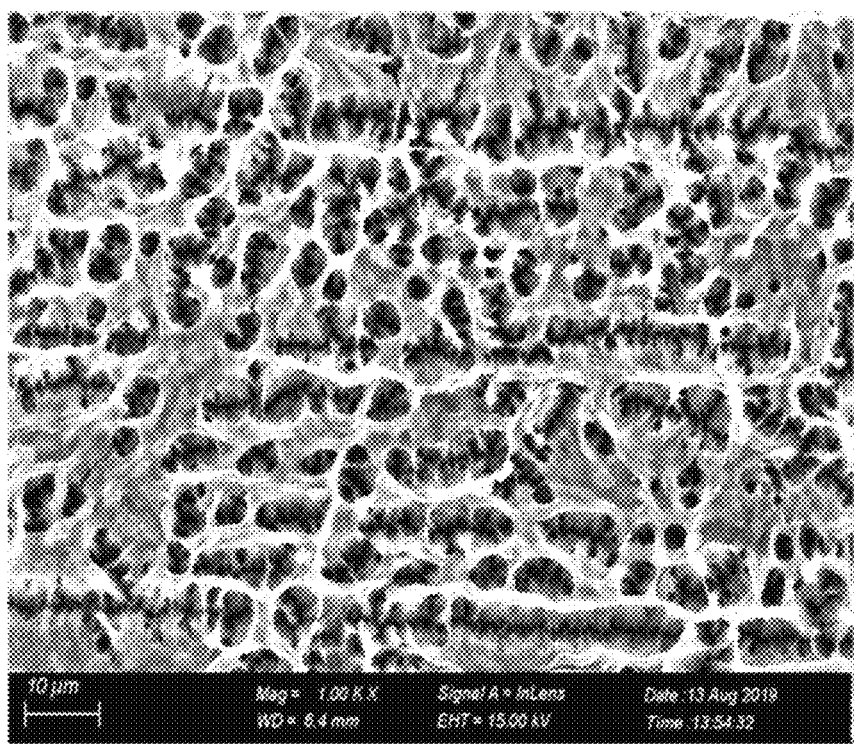
FIG. 6A shows a topography of a material obtained after element loading is carried out on the base material prepared by insufficient acid etching of transition metal nickel as the basic material in Comparative Example 2 of the disclosure.
Figure 6B:
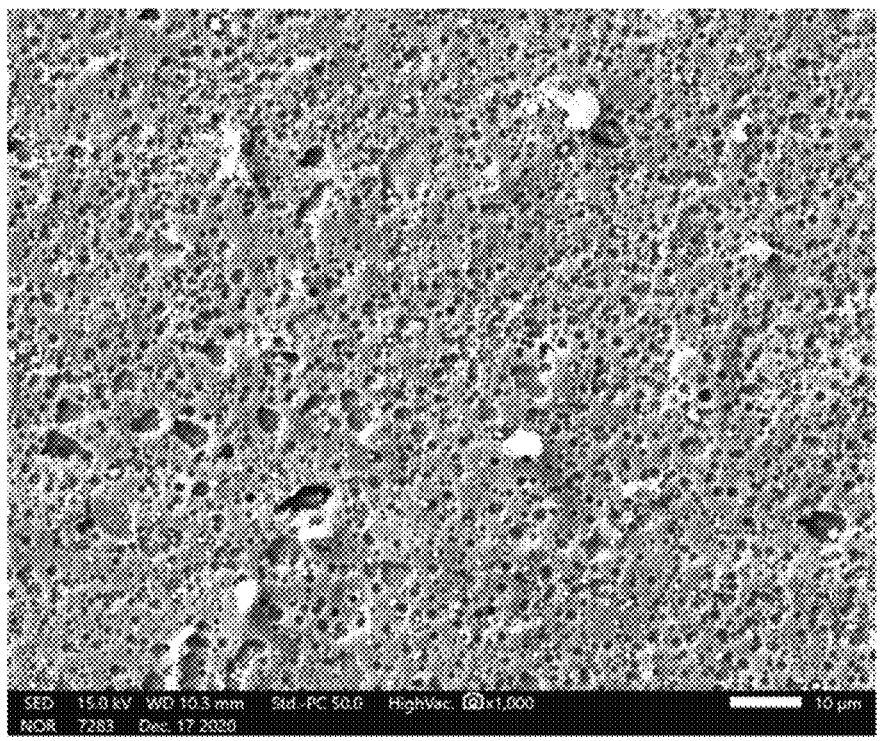
FIG. 6B shows a topography of a material obtained after element loading is carried out on the base material prepared by excessive acid etching of transition metal nickel as the basic material in Comparative Example 2 of the disclosure.
Figure 7:
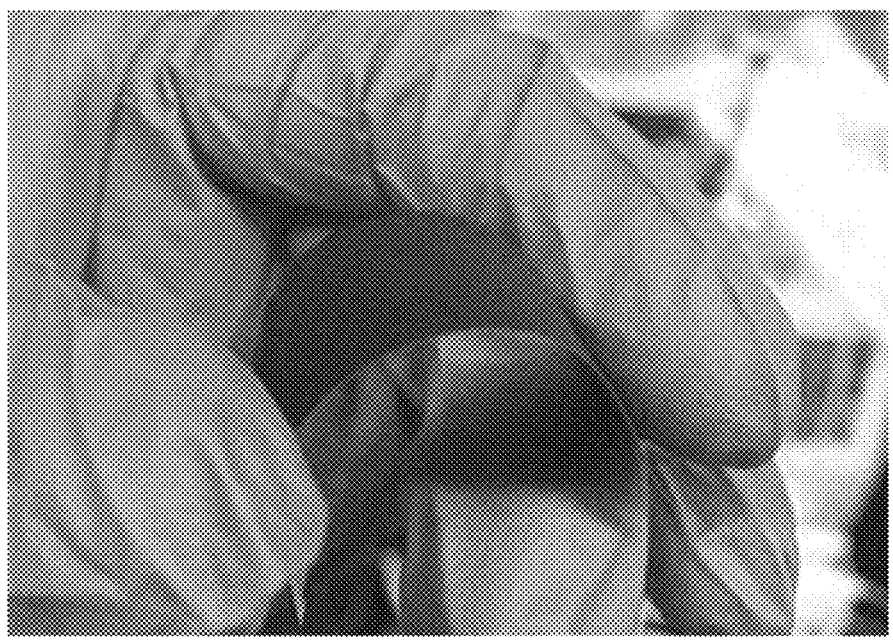
FIG. 7 shows a pictorial diagram of a base material with orientation flexibility prepared in Example 1 of the disclosure.

This comparative example was basically the same as Example 1, with the only difference as follows: the acid solution concentration and acid etching time parameters in the step 3) were changed in the preparation process of the base material, to obtain two groups of base materials, which were named as 2C-1; 2C-2 respectively; specifically:

Base material 2C-1: the acid concentration was 12 wt. %, the hydrogen ion concentration in the phosphoric acid solution was $9.8 \times 10^{-3}$ mol/L, the pH was 2.01, and the acid etching time was 90 min;

Base material 2C-2: the acid concentration was 0.05 wt. %, the hydrogen ion concentration in the phosphoric acid solution was $3.9 \times 10^{-4}$ mol/L, the pH was 3.41, and the etching time was 20 min; the rest were the same as those in Example 1;

As shown in FIG. 6A, the base material 2C-2 was not sufficiently etched to cross-link the nanopore array formed along the convex stripes, and the structured surface of the base material did not form the basic first structural channel and the first protrusion portion. As shown in FIG. 6B, the base material 2C-1 had obviously excessive acid etching, resulting in only a part of the pore structure remaining on the surface of the material and almost no structured surface any longer.

Example 5

In this example, an ozone oxidation catalyst was prepared using a base material according to the aforementioned part of Preparation of Two-Dimensional Ozone Catalytic Materials. The base material 1A was used to prepare an ozone oxidation catalyst in Example 1, which was named as 1A-catalyst;

The base material 2A was used to prepare an ozone oxidation catalyst, in Example 2, which was named as 2A-catalyst;

The base material 3A was used to prepare an ozone oxidation catalyst in Example 3, which was named as 3A-catalyst;

The base material 4A was used to prepare an ozone oxidation catalyst in Example 4, which was named as 4A-catalyst;

The aluminum base-base material 1C was used to prepare an ozone oxidation catalyst in Comparative Example 1, which was named as 1C-catalyst;

The aluminum base-base materials 2C-1, 2C-2 were used to prepare ozone oxidation catalysts in Comparative Example 2, which were named as 2C-1-catalyst and 2C-1-catalyst respectively;

At the same time, as a comparison, the corresponding two-dimensional ozone catalytic material was prepared based on the aluminum foil 0.5A without acid etching control after anodization, which was named as 0.5A-catalyst.

The two-dimensional ozone catalytic material of 1A-catalyst prepared by the above method was based on an aluminum foil, and was subjected to anodization, acid etching control, and vacuum impregnation (precursor intrusive loading). The above preparation method not only made the two-dimensional ozone catalytic material to be flexible, but also greatly improved the mechanical strength and structural stability of the material. Compared with the catalyst prepared from the base material (FIG. 13A) only after anodizing, the catalyst prepared from the base material (FIG. 13B) after acid etching control had better mass transfer performance during use. Therefore, when the two-dimensional ozone catalytic material prepared by the invention was applied to the semi-continuous flow ozone catalytic oxidation wastewater, mass transfer could be carried out along a structural channel interconnected with a certain hole, which greatly improved the mass transfer efficiency.

Example 6

In this example, the anodized hard template 0.5A after anodizing, cleaning and drying, the base material 1A after acid etching control and cleaning and drying in Example 1, and the product base material 1C in Comparative Example 1 were selected to perform a bending test respectively. The results were shown in Table 1.

TABLE 1

Comparison of β values of mechanical properties of base materials in different preparation stages

| Preparation stage of base material | Angleβ(°) |
|---|---|
| Anodized hard template 0.5 A in Example 1 | Below 10 |
| Finished base material 1A in Example 1 | Approaching 180 |
| Undrawn base material 1C in Comparative Example 1 | Approaching 90 |
| Excessively acid-etched base material 2C-1 in Comparative Example 2 | Approaching 180 |
| Insufficiently acid-etched base material 2C-2 in Comparative Example 2 | Approaching 30 |

Figure 4C:
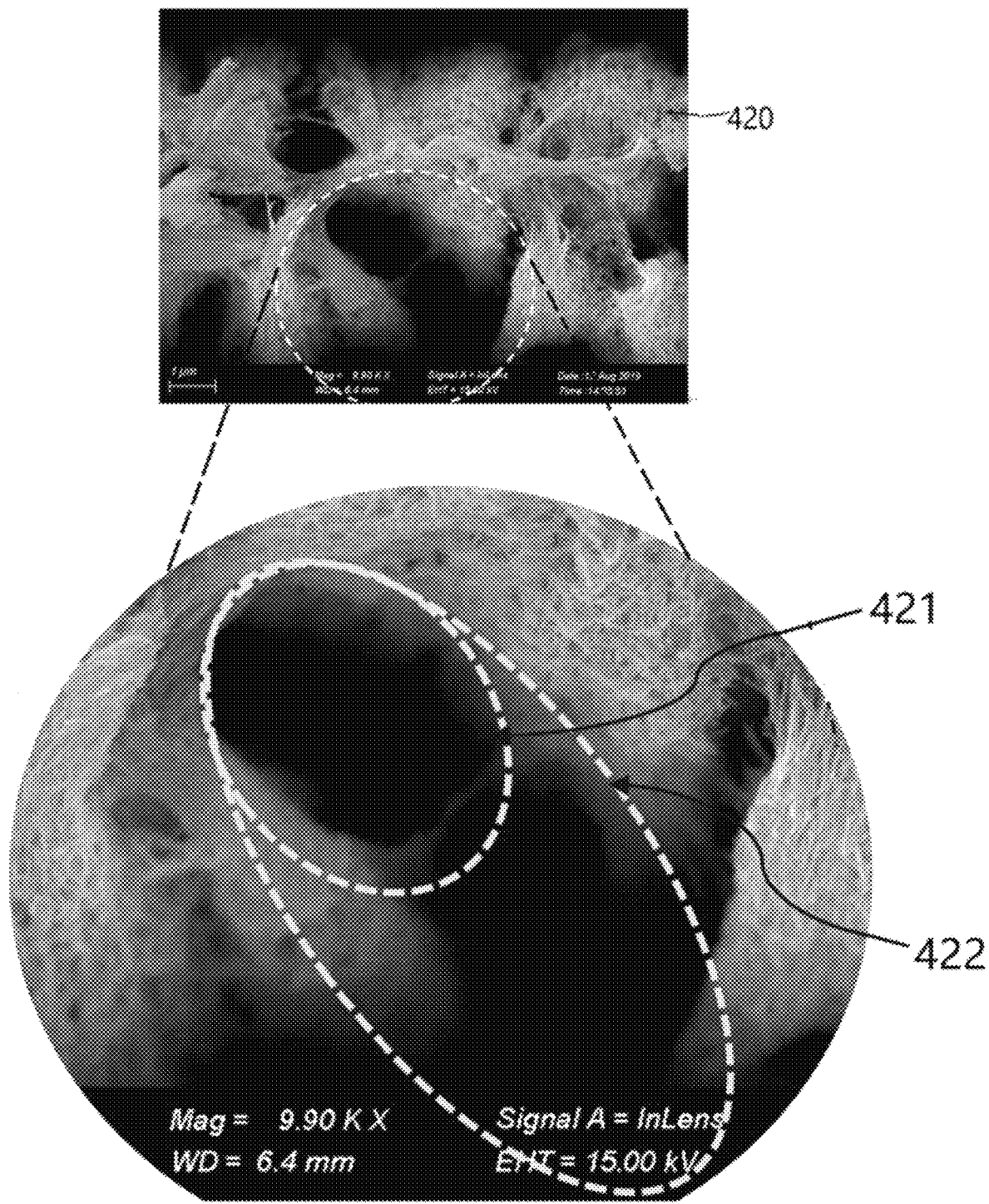
FIG. 4C shows an enlarge view of the first protrusion portion and the holes thereon after being damaged by acid etching.

It should be noted that, for the anodized hard template 0.5A as shown in the above table, after the aluminum foil was anodized, a dense porous oxide film would be formed on its surface, and the obtained material was extremely brittle, dense and fragile, without any flexibility; for the finished base material 1A in Example 1 and the undrawn base material 1C in Comparative Example 1 in above table, the flexibility of the material would be improved to a certain extent after acid etching; the base material 1C in Comparative Example 1 that was not drawn had improved flexibility due to the existence of the oxide film and its pore structure, but the ability to bend was limited; while for the finished base material 1A in Example 1 provided by the disclosure, due to the effect of the concave and convex stripes on the surface, a structure shown in FIG. 4A-4C was formed after acid etching control, so the flexibility was greatly improved, and the ability to bend became stronger.

Comparative Example 3 Preparation of Conventional Granular Three-Dimensional Catalysts In this comparative example, three conventional granular three-dimensional catalysts were prepared, which were named as 1B-catalyst, 2B-catalyst, and 3B-catalyst respectively; the preparation method of conventional granular three-dimensional catalysts was as follows:

1) Three groups of γ-alumina particles with the same mass and a size of 3-5 mm were taken and washed clean with deionized water, dried in a drying oven at 50° C.;
2) The following three groups of substances were weighed at room temperature and prepared into precursor solutions:
Group 1 (1 B-catalyst): the precursor solution was the same as that in Example 1;
Group 2 (2 B-catalyst): the precursor solution was the same as that in Example 2;
Group 3 (3 B-catalyst): the precursor solution was the same as that in Example 3;
3) The weighed three groups of γ-alumina were subjected to vacuum impregnation in the three groups of precursor solutions in step 2), respectively (a certain amount of precursor solution was measured, and the selected three groups of γ-alumina could just be immersed in the precursor solutions); the immersion time and temperature of group 1 were the same as those in Example 1; the immersion time and temperature of group 2 were the same as those in Example 2; and the immersion time and temperature of group 3 were the same as those in Example 3;
4) After immersion, the γ-alumina placed at room temperature, standing for 15 h, to fully diffuse the precursor; then placed in a 70° C. vacuum oven for drying and pre-pyrolysis for 15 h;

5) The base material after drying and pre-pyrolysis was placed in an argon protective furnace for high-temperature calcination treatment; heated to 550° C. at a rate of 3° C./min, holding for 1.5 h, then cooled to room temperature at a rate of 3° C./min, to obtain a finished product.

Example 7 Semi-Continuous Flow Ozone Catalytic Oxidation Test

Figure 8:
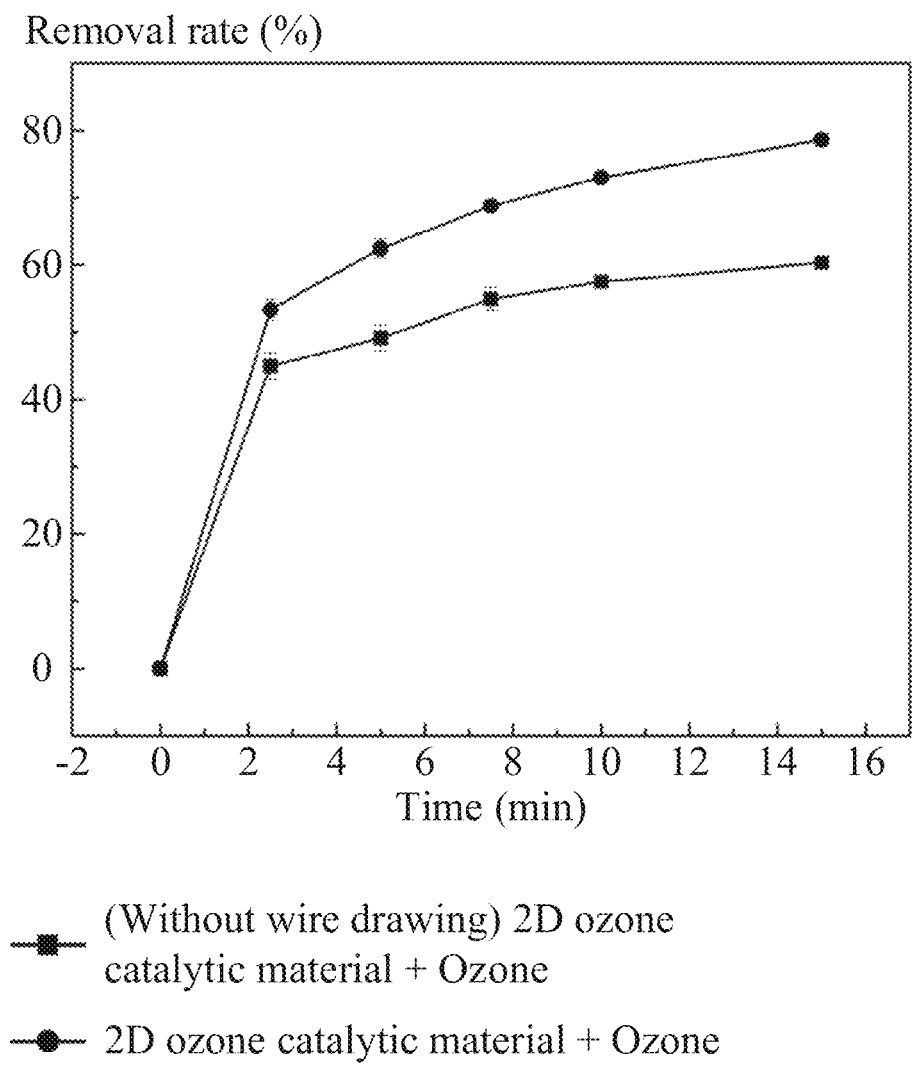
FIG. 8 shows a comparison diagram of the oxalic acid removal effect of the two-dimensional ozone catalytic material prepared by using the base material prepared in Example 1 and Comparative Example 1 as the matrix.

In this example, a semi-continuous flow ozone catalytic oxidation test was carried out for each catalyst prepared above, specifically:

Group 1—catalyst types: 1A-catalyst, 1C-catalyst;
Type of water body to be treated: the water body to be treated with simulated contaminant of oxalic acid;
Conclusion: As shown in FIG. 8, apparently, the aluminum-based two-dimensional ozone catalytic material prepared by wire drawing during the degradation process was significantly better than that prepared without wire drawing; at 15 min, the removal rate of oxalic acid by the aluminum-based two-dimensional ozone catalytic material prepared by wire drawing reached more than 80%, while the removal rate of oxalic acid by the aluminum-based two-dimensional ozone catalytic material prepared without wire drawing treatment was only about 60%.

Figure 13B:
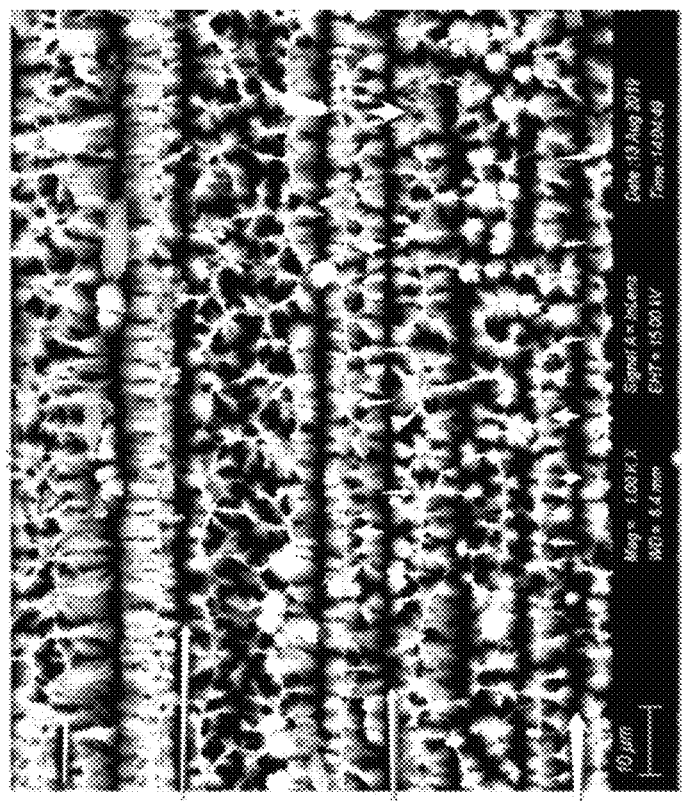
FIG. 13B shows a mass transfer schematic diagram of the material after anodization, acid etching control and element loading during the water treatment.
Figure 13A:
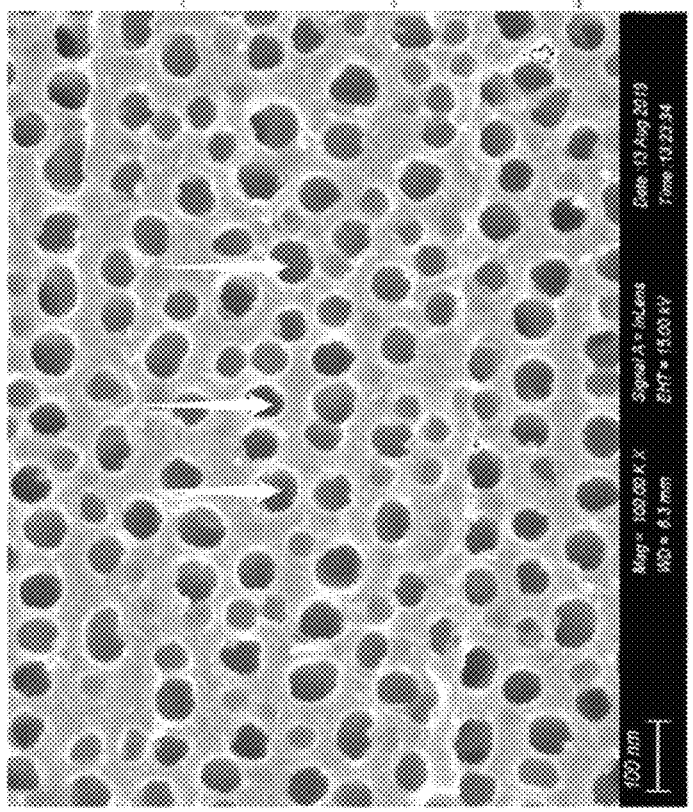
FIG. 13A shows a mass transfer schematic diagram of the material after element loading of the transition metal aluminum foil after anodization in Example 1 of the disclosure during the water treatment.

As shown in FIGS. 13A-13B, the holes of the base material prepared in Comparative Example 1 were still distributed in a regular array, and various nanopores were independent of each other. When applied to the semi-continuous flow ozone catalytic oxidation test, the water and contaminants could only diffuse through each nanopore port, and the efficiency was low; moreover, because the ozone catalytic oxidation reaction was a surface reaction, its large number of internal structures had no contribution to the reactions.

Figure 9:
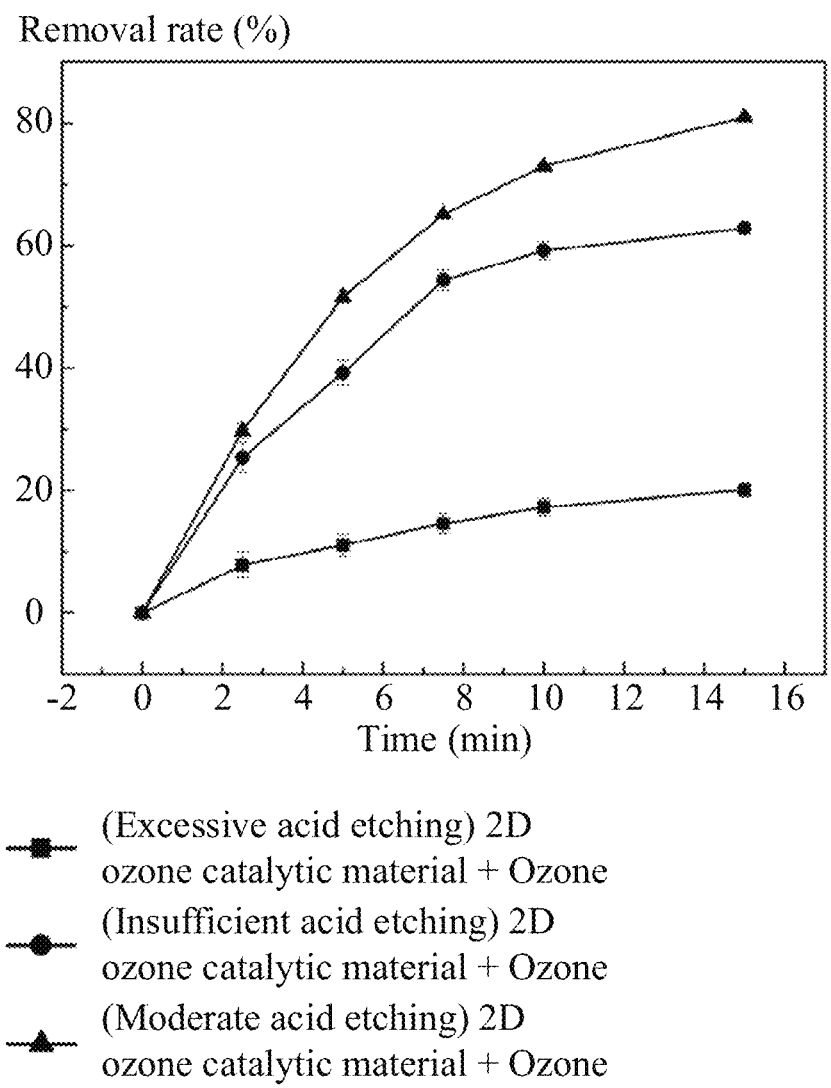
FIG. 9 shows a comparison diagram of the phenol removal effect of the two-dimensional ozone catalytic material prepared by using the base material prepared in Example 1 and Comparative Example 2 as the matrix.

Group 2—catalyst types: 1A-catalyst, 2C-1-catalyst, 2C-2-catalyst;
Type of water body to be treated: the water body to be treated with simulated contaminant of phenol;
Conclusion: As shown in FIG. 9, apparently, the aluminum-based two-dimensional ozone catalytic material prepared by appropriate acid etching control of parameters during the degradation process was significantly better than that prepared with too large or too small parameters in the acid etching control process; at 15 min, the removal rate of phenol by the aluminum-based two-dimensional ozone catalytic material prepared by appropriate acid etching control of parameters reached more than 80%, while the removal rate of phenol by the aluminum-based two-dimensional ozone catalytic material prepared with too large or too small parameters in the acid etching control process were 20% and 60%, respectively.
Description for 1A-catalyst: in the process of acid etching control, the base material would gradually open the hole wall barrier between the hard template nanopores formed after anodization under the action of appropriate acid solution, and cracks would be formed between nanopore arrays in the direction of the convex stripes. In the direction perpendicular to the convex stripes, alternately arranged nanopore array-fault channel-nanopore array morphology composed of single or multiple rows of nanopores would be gradually generated.
Description for 2C-1-catalyst: if the surface nanopores were not sufficiently corroded in the process of acid etching control, the nanopores could not be fully interconnected, forming an effective structured surface.
Description for 2C-2-catalyst: If the corrosion was excessive in the process of acid etching control, the surface part of the material would return to a smooth structure, and an effective structured surface would also not be formed.

Group 3—catalyst types: 0.5A-catalyst, 1A-catalyst.
Type of water body to be treated: the water body to be treated with simulated contaminant of oxalic acid;
Conclusion: In order to understand the degradation of oxalic acid during the test, the water samples at 0, 2.5, 5, 7.5, 10, 15, 25, 35, and 60 min in the catalytic ozone oxidation reaction process were tested. The final removal rate of oxalic acid by 1A-catalyst was higher than 80%; and the final removal rate of oxalic acid by 0.5A-catalyst was only 25%. In addition, after the water treatment was completed, the damage rate of 0.5A-catalyst was as high as about 20%, while 1A-catalyst maintained nearly 100% integrity.

Figure 10:
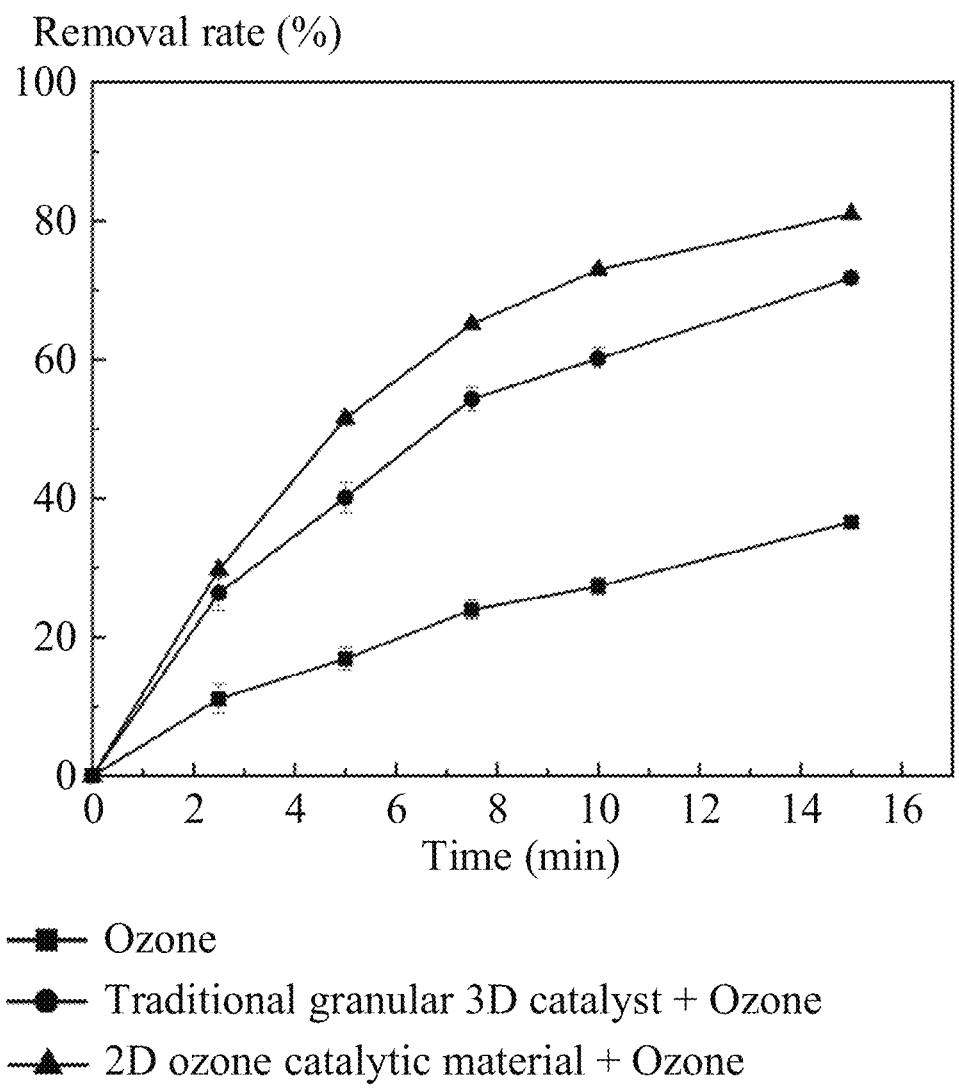
FIG. 10 shows a comparison diagram of the phenol removal effect of two-dimensional ozone catalytic material, single ozone, and traditional granular three-dimensional catalyst prepared by using the base material prepared in Example 1 as the matrix.
Figure 11:
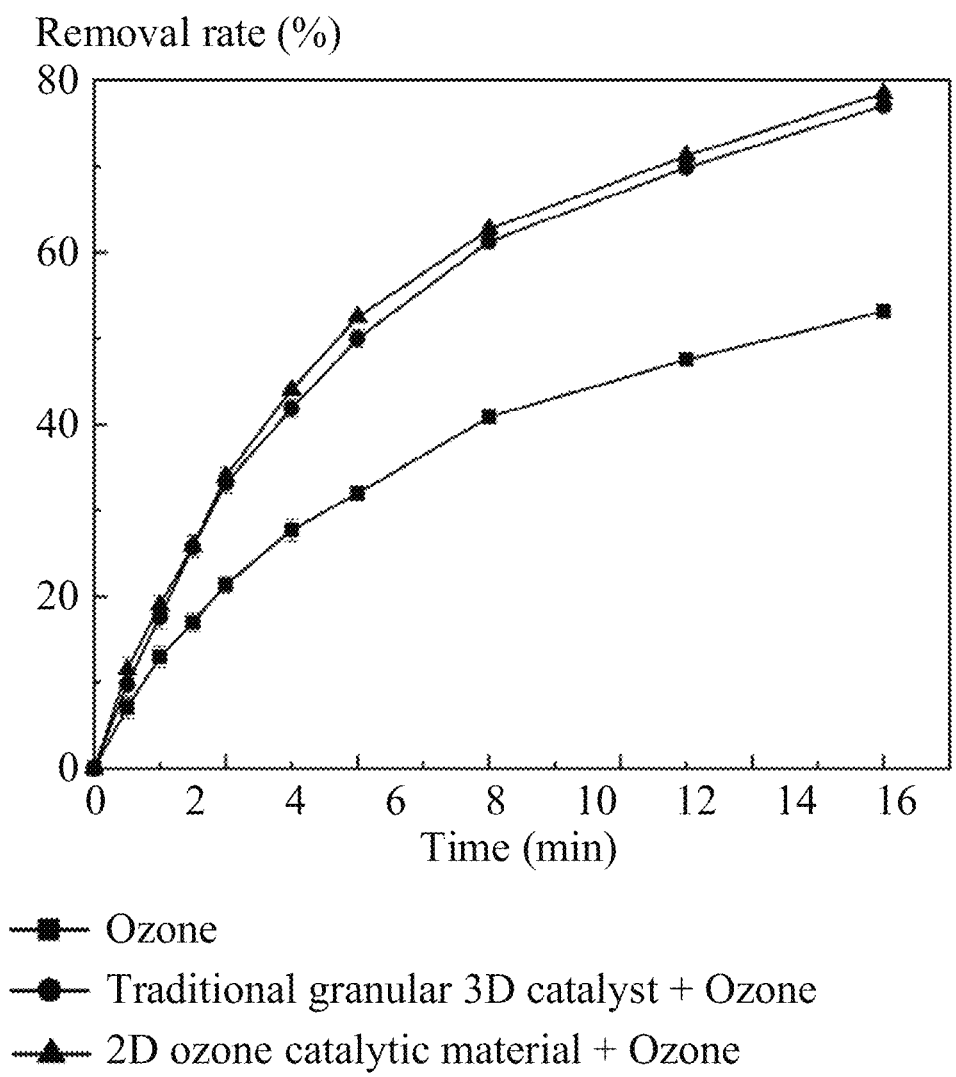
FIG. 11 shows a comparison diagram of the pyrazole removal effect of two-dimensional ozone catalytic material, single ozone, and traditional granular three-dimensional catalyst prepared by using the base material prepared in Example 2 as the matrix.

Group 4—Catalyst types: 1A-catalyst, 2A-catalyst, 3A-catalyst, conventional granular three-dimensional catalysts (1B-catalyst, 2B-catalyst, 3B-catalyst) of Comparative Example 3.
Type of water body to be treated: three types of water bodies to be treated, namely, water body to be treated with simulated contaminant of phenol; water body to be treated with simulated contaminant of pyrazol; water body to be treated with simulated contaminant of oxalic acid;
Conclusion: with reference to FIG. 10, for the catalyst with the same loading volume in the reactor, the loading mass of 1A-catalyst was only ⅕ of the granular three-dimensional catalyst 1B. It was obvious that the removal effect of phenol by 1A-catalyst was obviously better than that of the granular three-dimensional catalyst 1B during the degradation process; at 15 min, the removal effect of phenol by the aluminum-based two-dimensional ozone catalyst material was more than 80%, while the removal effect of phenol by the granular three-dimensional catalyst 1B was about 70%, and the removal effect of phenol by ozone oxidation alone was only 30%.
Conclusion: with reference to FIG. 11, for the catalyst with the same loading volume in the reactor, the loading mass of 2A-catalyst was only ⅕ of the granular three-dimensional catalyst 2B. It was obvious that the removal effect of pyrazol by 2A-catalyst was slightly better than that of the granular three-dimensional catalyst 2B during the degradation process; and with reference to Table 1, at 60 min, the removal rate of pyrazole by the granular three-dimensional catalyst 1B was about 80%, while the removal rate of pyrazole by the 2A-catalyst was slightly higher than 80%, and the removal rate of pyrazole by ozone oxidation alone was only 50%.

Figure 12:
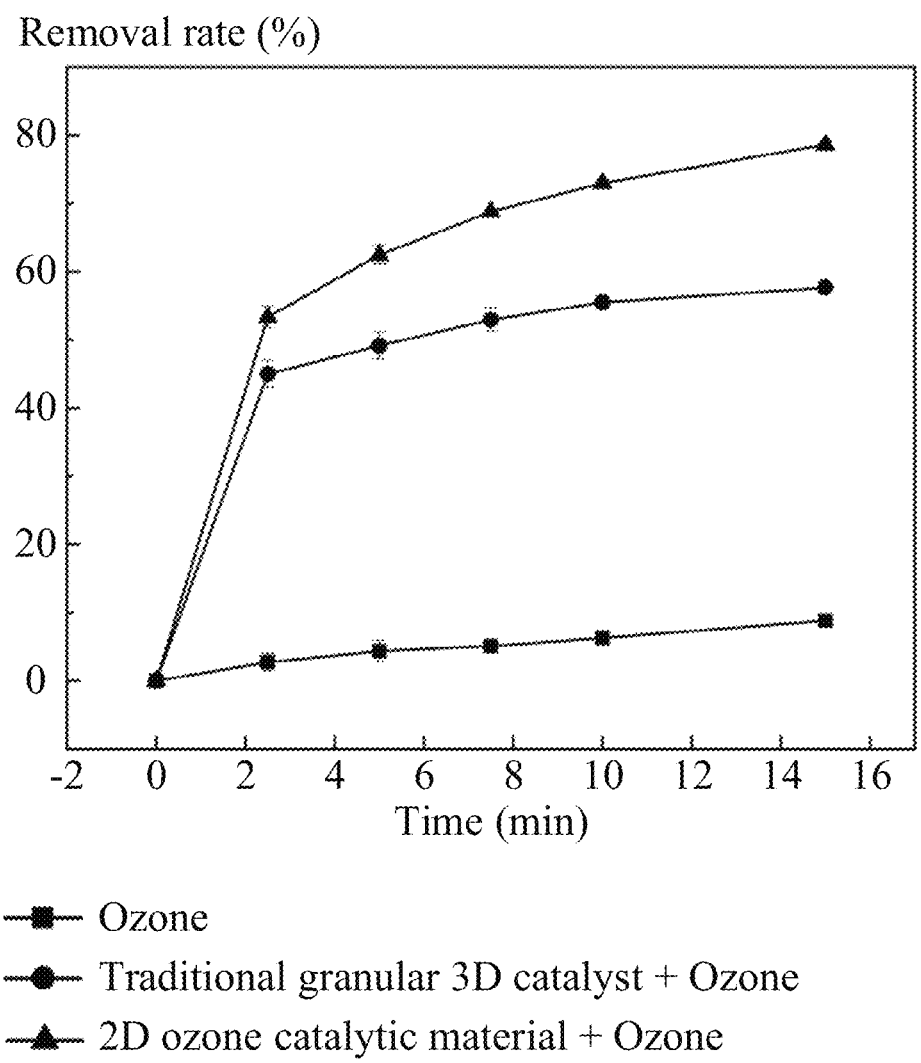
FIG. 12 shows a comparison diagram of the oxalic acid removal effect of two-dimensional ozone catalytic material, single ozone, and traditional granular three-dimensional catalyst prepared by using the base material prepared in Example 3 as the matrix.

With reference to FIG. 12, for the catalyst with the same loading volume in the reactor, the loading mass of 3A-catalyst was only ⅕ of the granular three-dimensional catalyst 3B. It was obvious that the removal effect of oxalic acid by 3A-catalyst was obviously better than that of the granular three-dimensional catalyst 3B during the degradation process; and with reference to Table 1, at 15 min, the removal rate of oxalic acid by the 3A-catalyst was more than 90%, while the removal rate of oxalic acid by the granular three-dimensional catalyst 3B was only 60%, and the removal rate of oxalic acid by ozone oxidation alone was only 8%.

Figure 18:
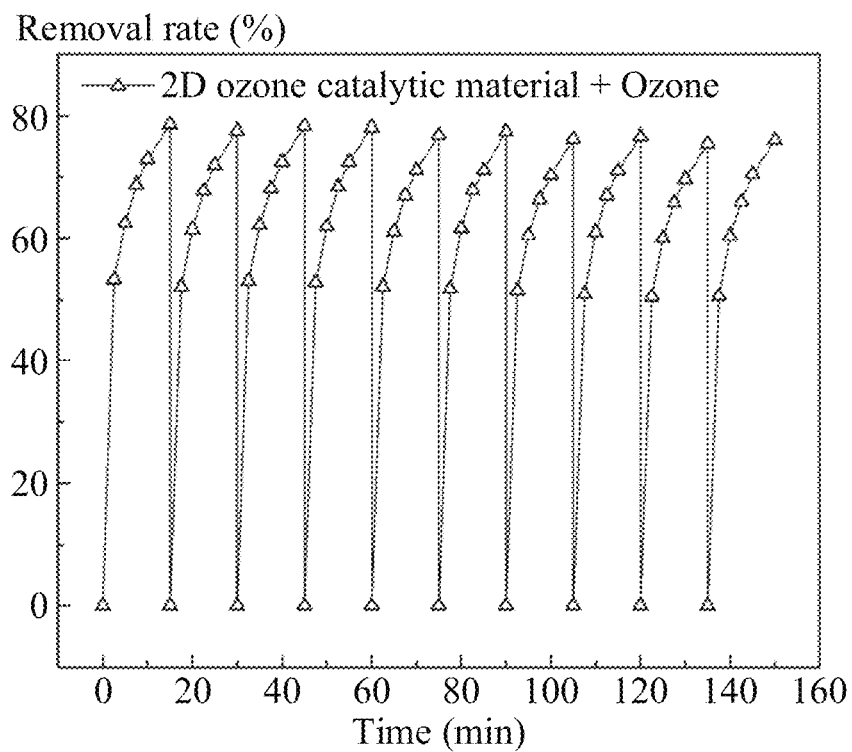
FIG. 18 shows a two-dimensional ozone catalytic material prepared by using the base material obtained in Example 1 as a matrix.

In addition, FIG. 18 was a schematic diagram of the effect of recycling 1A-catalyst prepared in Example 1 for oxalic acid degradation; as shown in the figure, in the process of recycling, 1A-catalyst maintained an efficient removal rate of oxalic acid, and after 20 times of recycling, the integrity was still as high as 99%, nearly 100%.

All of the above showed that, for the removal of different target contaminants, the two-dimensional ozone catalytic material provided by the disclosure had obvious advantages for the removal of target contaminants when the dosage was only ⅕ of the conventional granular three-dimensional catalyst, indicating that the ozone oxidation catalytic performance of the two-dimensional ozone catalytic material provided by the disclosure was obviously superior to the conventional granular three-dimensional catalyst.

It will be obvious to those skilled in the art that changes and modifications may be made, and therefore, the aim in the appended claims is to cover all such changes and modifications.

The invention claimed is:

1. A base material, comprising: a first structural layer, a second structural layer located at least on one surface of the first structural layer; the second structural layer comprising:
   a) a first protrusion portion, wherein the first protrusion portion extends along one length direction of the second structural layer;
   b) a first concave portion that extends substantially in the same direction as the first protrusion portion and is adjacent to the first protrusion portion; and
   c) a plurality of holes distributed in the first protrusion portion;
   at least 0.05% of the holes communicate with adjacent first concave portions; and
   the first structural layer comprises at least one transition metal at a content of at least 90%, and the second structural layer comprises an oxide of the transition metal at a content of at least 30%.

2. The base material of claim 1, wherein the base material is flexible in at least one direction; the base material has a bending angle of not less than 90°; and the base material has a bulk density not higher than 1 g/cm$^3$.

3. The base material of claim 1, wherein the base material is prepared by using transition metal flakes as raw materials;
   a plurality of concave and convex stripes with a substantially uniform direction is disposed on the transition metal flakes, and cross-sections of the concave and convex stripes have a mesoscopic scale; and
   a transition metal oxide film is formed on surfaces of the transition metal flakes, and has a hole array consistent with a direction of the concave and convex stripes; and the holes have an aperture of mesoscopic scale or an aperture of nanometer and/or micron scale.

4. The base material of claim 3, wherein
   the transition metal oxide film and the hole array thereon is formed by performing anodizing treatment on the transition metal flakes; and
   the second structural layer is formed by performing an etching treatment on the transition metal oxide film and the hole array thereon.

* * * * *